United States Patent [19]
Saito

[11] Patent Number: 5,991,702
[45] Date of Patent: Nov. 23, 1999

[54] AXISYMMETRIC FIGURE SHAPING DEVICE FOR GENERATING CURVILINEAR FIGURE PRECISELY AXISYMMETRIC WITH RESPECT TO AXIS OF SYMMETRY AND METHOD THEREFOR

[75] Inventor: Shigeru Saito, Tokyo, Japan

[73] Assignee: NEC Corporation, Tokyo, Japan

[21] Appl. No.: 08/972,039

[22] Filed: Nov. 17, 1997

[30] Foreign Application Priority Data

Nov. 15, 1996 [JP] Japan ................................. 8-320791

[51] Int. Cl.$^6$ ........................................... G06K 9/00
[52] U.S. Cl. ........................................ 702/155; 382/224
[58] Field of Search .................................. 382/141, 152, 382/170, 190, 224; 702/94, 95, 155–167

[56] References Cited

U.S. PATENT DOCUMENTS

| | | | |
|---|---|---|---|
| 4,183,013 | 1/1980 | Agrawala et al. | 382/173 |
| 4,797,842 | 1/1989 | Nackman et al. | 395/500.21 |
| 4,896,279 | 1/1990 | Yoshida | 702/169 |
| 5,790,700 | 8/1998 | Saito | 382/203 |
| 5,889,892 | 3/1999 | Saito | 382/293 |

FOREIGN PATENT DOCUMENTS

| | | |
|---|---|---|
| 62-111369 | 5/1987 | Japan . |
| 63-261481 | 10/1988 | Japan . |
| 4-060878 | 2/1992 | Japan . |
| 6-333037 | 12/1994 | Japan . |
| 8-227457 | 9/1996 | Japan . |
| 8-227459 | 9/1996 | Japan . |

*Primary Examiner*—Marc S. Hoff
*Assistant Examiner*—Craig Steven Miller
*Attorney, Agent, or Firm*—Foley & Lardner

[57] ABSTRACT

An axisymmetric figure shaping device including an input unit for receiving input of a figure formed including a curve and a data processing unit for shaping an input figure to be precisely symmetric with respect to a predetermined axis of symmetry, the data processing unit including a characteristic point calculating unit for calculating, from a coordinate point sequence of a figure input through the input unit, coordinates of each vertex, and maximal points and minimal points in the horizontal and the vertical directions of the input figure and taking them as characteristic points of the input figure, a candidate axis of symmetry calculating unit for calculating a candidate axis of symmetry for use in the decision of symmetry based on calculated characteristic points, a symmetry decision unit for deciding about symmetry of an input figure with respect to a calculated candidate axis of symmetry, and a shaping unit for shaping, when a decision is made that an input figure has symmetry with respect to a candidate axis of symmetry, the input figure into a form precisely axisymmetric with respect to the candidate axis of symmetry.

28 Claims, 28 Drawing Sheets

FIG. 19(A)    FIG. 19(B)
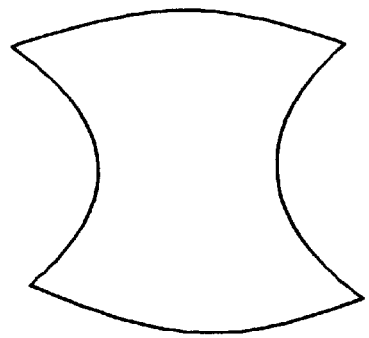
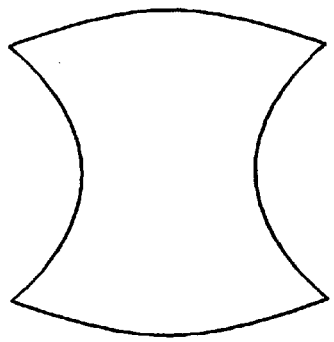
FIG. 20
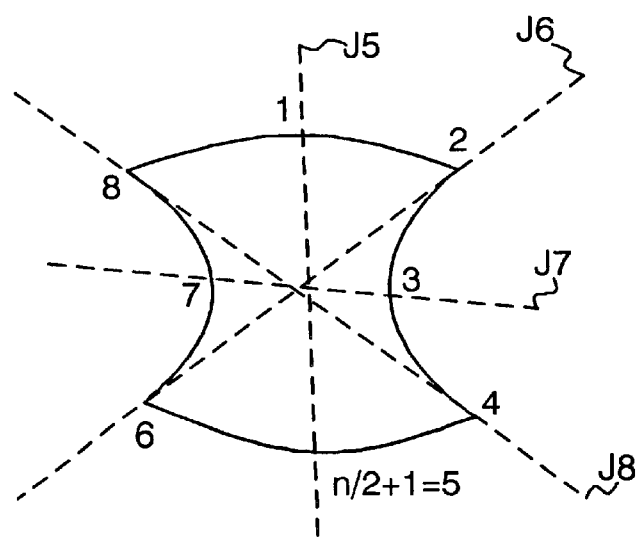

AXISYMMETRIC FIGURE SHAPING DEVICE FOR GENERATING CURVILINEAR FIGURE PRECISELY AXISYMMETRIC WITH RESPECT TO AXIS OF SYMMETRY AND METHOD THEREFOR

BACKGROUND OF THE INVENTION

1. Field of the Invention

The present invention relates to an axisymmetric figure shaping device for shaping an input figure which has a form approximately symmetric with respect to a predetermined axis of symmetry so as to be precisely symmetric with respect to the axis of symmetry.

2. Description of the Related Art

Devices which process image data using a computer, such as a CAD system and graphics software to run on a personal computer, are in general provided with a function of shaping an input figure which is approximately symmetrical with respect to a predetermined reference line (axis of symmetry) so as to be precisely symmetrical with respect to the reference line as the axis of symmetry.

One of conventional figure shaping techniques of this kind for shaping axisymmetric figures is disclosed, for example, in Japanese Patent Laying-Open (Kokai) No. Showa 62-111369. The technique recited in this literature is employed for automatically reading a design drawing to recognize a descriptive symbol illustrated in the drawing. FIG. 26 shows structure of the figure shaping device recited in the literature. As illustrated in the figure, the figure shaping device according to the conventional technique includes a recognition processing unit 101, a symbol table 102 and a symmetric transformation unit 103. The recognition processing unit 101 includes a symmetric form decision unit 111 and a comparison circuit 112.

FIG. 27 is a flow chart showing a flow of processing by the figure shaping device of FIG. 26. With reference to the figure, first, input image to be recognized is applied to the recognition processing unit 101. The recognition processing unit 101 outputs a recognition result (a) of the input figure (FIG. 27, Steps 2601 and 2602).

Next, the symmetric form decision unit 111 refers to the symbol table 102 in which classification of symmetric and asymmetric symbols is defined to decide whether the image based on the recognition result (a) corresponds to a symmetric symbol or not (Step 2603). Here, that image corresponds to a specific symbol indicates that a symbol exists which is approximate to the form of the image among symbols stored in the symbol table 102. When a decision is made that the input image corresponds to a symbol which is not symmetric, the recognition result (a) is output as an ultimate recognition result (Step 2610).

On the other hand, when a decision is made that the image corresponds to a symmetric symbol, the symmetric transformation unit 103 conducts symmetric transformation with respect to the input image (Step 2604). Then, with respect to the image subjected to symmetric transformation, the recognition processing unit 101 again conducts recognition processing, whereby a recognition result (b) is obtained as a result of the processing (Steps 2605 and 2606).

Next, the comparison circuit 112 compares the recognition result (a) with the recognition result (b). When the two recognition results (a) and (b) coincide with each other, the recognition result (a) is output as an ultimate result (Steps 2607 and 2608). When the recognition results (a) and (b) fail to coincide with each other, processing is completed because of impossibility of symmetry decision (Steps 2607 and 2609).

Another conventional figure shaping technique for shaping an axisymmetric figure is disclosed, for example, in Japanese Patent Laying Open (Kokai) No. Showa 63-261481. The technique recited in the literature is employed for recognizing a drawing made based on the broad notation and supplementing the drawing with a dimension etc. which is not illustrated in the drawing based on the illustrated contents of the drawing. FIG. 28 shows structure of the figure shaping device recited in the literature. As illustrated in the figure, the figure shaping device according to the conventional technique includes a figure recognition device 201, a candidate symmetric line segment extracting means 202, a vertical line segment setting means 203, an operation means 204 and a drawing information setting means 205. The figure recognition device 201 includes a read processing unit 211, an image data storage unit 212, a vector processing unit 213, a vector classification processing unit 214, a symbol recognition processing unit 215, a line segment identification unit 216, a character recognition processing unit 217 and a recognition result storage unit 218.

FIG. 29 is a flow chart showing a flow of processing by the figure shaping device of FIG. 28. FIG. 30 is a diagram for use in explaining a method of deciding about symmetry of a shape line intersecting with a central line. With reference to these figures, first in the figure recognition device 201, a figure applied through the read processing unit 211 is stored in the image data storage unit 212. The vector processing unit 213 conducts polygonal approximation with respect to the image data stored in the image data storage unit 212 to convert the data into vector data and supplies the data to the vector classification processing unit 214.

The vector classification processing unit 214 classifies the applied vector data into symbols, line segments and characters and supplies them to the symbol recognition processing unit 215, the line segment identification processing unit 216 and the character recognition processing unit 217, respectively. The line segment identification processing unit 216 classifies vector data indicative of applied line segments into shape lines, central lines, etc. and stores them in the recognition result storage unit 218. The symbol recognition processing unit 215 and the character recognition processing unit 217 identify applied characters and symbols, respectively, attach attributes to the characters and symbols based on the identification results and store them in the recognition result storage unit 218 (Step 2801).

Next, the candidate symmetric line segment extracting means 202 extracts central lines which have a possibility of being symmetric from the recognition result storage unit 218 and counts the number of the central lines (Step 2802), and with respect to each of the extracted central lines, checks existence/non-existence of a shape line intersecting with the central line or an isolated shape line (Step 2803). If there exists a central line intersecting with a shape line or a central line having an isolated form at its opposite ends, the vertical line segment setting means 203 and the operation means 204 identify symmetry of the shape line or that of the isolated form.

Description will be here made of a symmetry decision method with reference to FIG. 30. The vertical line segment setting means 203, for example, drops a perpendicular L2 from an end point P2 of the vector to a central line b and the operation means 204 obtains a distance l2 between the end point P2 and the central line b. The unit further obtains a distance m2 between a point of intersection x2 on the vector c intersecting with an extended line of the perpendicular L2 and the central line b. Then, a difference between these two distances l2 and m2 is calculated to see if the difference satisfies the following expression with respect to a predetermined threshold value (A½).

$$|l2-m2|<A\tfrac{1}{2} \qquad (1)$$

The same calculation will be made with respect to other end points. Then, when the expression (1) holds for all the end points and a sum of the respective differences of distance satisfies the following expression with respect to a predetermined threshold value Q:

$$\Sigma|ln-mn|<Q \qquad (2)$$

determination is made that the shape line is symmetric with respect to the central line b (Step 2805).

After symmetry decision is made with respect to all the central lines, the drawing information setting means 205 sets omitted drawing information based on part of the drawing information indicated at the shape line having symmetry (Step 2807).

The above-described conventional figure shaping devices have the following shortcomings.

The first conventional figure shaping device which makes a decision with reference to a symbol table has a drawback that when a symmetric figure which is not defined in the symbol table is applied, the device is incapable of identifying the figure as a symmetric figure. The reason is that for confirming whether an input figure corresponds to a symbol stored in the symbol table in the course of processing, all figures to be identified as symmetric figures should be defined in the symbol table.

The second conventional axisymmetric figure shaping device which shapes a figure with respect to a central line has a drawback that a user should make a drawing with an axis of symmetry in mind, which makes figure input work laborious. The reason is that the user needs to shape a figure while recognizing, as an axis of symmetry, only a central line drawn in advance as a kind of line indicative of a central line.

Other than the above-described conventional art, also proposed is a technique for automatically setting an axis of symmetry for an input figure and shaping the input figure so as to be precisely symmetric with respect to the axis of symmetry. This is, however, a shaping technique mainly for linear figures and is therefore incapable of effectively shaping an input figure which includes a curve.

SUMMARY OF THE INVENTION

A first object of the present invention is to provide an axisymmetric figure shaping device for shaping an arbitrary figure to be precisely axisymmetric with respect to one predetermined linear axis of symmetry or both of paired orthogonal linear axes of symmetry and a method therefor.

A second object of the present invention is to provide an axisymmetric figure shaping device capable of shaping even an input figure including an arbitrary curve with a need of neither special structure nor special procedure and a method therefor.

A third object of the present invention is to provide an axisymmetric figure shaping device which automatically extracts one linear axis of symmetry or one pair of orthogonal linear axes of axisymmetry for a figure including a curve drawn without an axis of symmetry in mind to generate a curvilinear figure precisely axisymmetric with respect to the extracted axis of symmetry and a method therefor.

According to the first aspect of the invention, an axisymmetric figure shaping device for shaping an input figure into a figure axisymmetric with respect to a predetermined axis of symmetry, comprises input means for receiving input of a figure, data processing means for shaping an input figure to be precisely symmetric with respect to a predetermined axis of symmetry, storage means for storing at least an input figure, a figure having been shaped and information regarding characteristic points of these figures, and output means for displaying an input figure and a figure having been shaped, the data processing means comprising characteristic point calculating means for calculating, from a coordinate point sequence of a figure input through the input means, coordinates of each vertex, maximal and minimal points in the horizontal and the vertical directions of the input figure and taking them as characteristic points of the input figure, candidate axis of symmetry calculating means for calculating a candidate axis of symmetry according to predetermined rules based on characteristic points calculated by the characteristic point calculating means, axis of symmetry for decision determining means for extracting, from all the candidate axes of symmetry calculated by the candidate axis of symmetry calculating means, candidate axes of symmetry for use in the decision of symmetry, one closest to the horizontal and the other closest to the vertical, symmetry decision line segment calculating measure mesh generating means for selecting an arbitrary one of two candidate axes of symmetry calculated by the axis of symmetry for decision determining means to generate a lattice forming a rectangular measure mesh which will cover the input figure centered around the selected candidate axis of symmetry, symmetry decision line segment calculating means for tracing points of intersection of the curve and the lattice forming a measure mesh from one of characteristic points at which the selected candidate axis of symmetry passes toward the other characteristic point, calculating a pair of intersection points located on opposite sides of the candidate axis of symmetry which are to be a reference for deciding about symmetry of the input figure and linking the pair of intersection points by a straight line to generate a symmetry decision line segment for use in deciding about symmetry of the input figure, distance of axis of symmetry calculating means for calculating a distance between a mid-point of the symmetry decision line segment and the candidate axis of symmetry, angle of axis of symmetry calculating means for calculating an angle of the intersection of the symmetry decision line segment and the candidate axis of symmetry to calculate a difference in angle between the angle of the intersection and a predetermined angle, symmetry decision means for calculating dispersion of all the values of a distance between a mid-point of the symmetry decision line segment and a candidate axis of symmetry calculated by the distance of axis of symmetry calculating means and dispersion of all the differences in angle calculated by the angle of axis of symmetry calculating means to decide about symmetry of the input figure according to the calculated dispersion of the parameters, and symmetrization processing means for changing coordinates of a pair of points of intersection of the curve and lattice and coordinates of characteristic points such that the input figure is precisely axisymmetric with respect to the candidate axis of symmetry when a decision is made by the symmetry decision means that the input figure has symmetry.

The angle of axis of symmetry calculating means may calculate a difference in angle between an angle of the intersection of the symmetry decision line segment and the candidate axis of symmetry and 90 degrees as the predetermined angle.

The data processing means comprises validity of decision line segment determining means for determining whether the symmetry decision line segment itself has symmetry with respect to the candidate axis of symmetry based on parameters calculated by the distance of axis of symmetry calculating means and the angle of axis of symmetry calculating means.

The data processing means comprises axis of symmetry for shaping determining means for determining, when the symmetry decision means decides that there exist a plurality of candidate axes of symmetry appropriate as an axis of symmetry of the input figure, which candidate axis of symmetry is to be used to conduct symmetric shaping of the input figure.

The data processing means comprises validity of decision line segment determining means for determining whether the symmetry decision line segment itself has symmetry with respect to the candidate axis of symmetry based on parameters calculated by the distance of axis of symmetry calculating means and the angle of axis of symmetry calculating mean, and axis of symmetry for shaping determining means for determining which candidate axis of symmetry is to be used to conduct symmetric shaping of the input figure when the symmetry decision means decides that there exist a plurality of candidate axes of symmetry appropriate as an axis of symmetry of the input figure.

In the preferred construction, the axisymmetric figure shaping device further comprises measure mesh size designating means for designating the size of a measure mesh formed of a lattice generated by the symmetry decision line segment calculating measure mesh generating means.

In the preferred construction, the axisymmetric figure shaping device further comprises reference element designating means for designating a reference element for use in symmetric shaping processing of the input figure by the symmetrization processing means.

According to the second aspect of the invention, an axisymmetric figure shaping device for shaping an input figure into a figure axisymmetric with respect to a predetermined axis of symmetry, comprises input means for receiving input of a figure, data processing means for shaping an input figure to be precisely symmetric with respect to a predetermined axis of symmetry, storage means for storing at least an input figure, a figure having been shaped and information regarding characteristic points of these figures, and output means for displaying the input figure and a figure having been shaped, the data processing means comprising characteristic point calculating means for calculating, from a coordinate point sequence of a figure input through the input means, coordinates of each vertex, maximal and minimal points in the horizontal and vertical directions of the input figure and taking them as characteristic points of the input figure, candidate axis of symmetry calculating means for calculating a candidate axis of symmetry according to predetermined rules based on characteristic points calculated by the characteristic point calculating means, candidate vertical axis of symmetry determining means for extracting, from all the candidate axes of symmetry calculated by the candidate axis of symmetry calculating means, a candidate vertical axis of symmetry as a candidate axis of symmetry closest to the vertical, candidate horizontal axis of symmetry determining means for extracting, from all the candidate axes of symmetry calculated by the candidate axis of symmetry calculating means, a candidate horizontal axis of symmetry based on a candidate vertical axis of symmetry extracted by the candidate vertical axis of symmetry calculating means, orthogonal axis of symmetry decision means for deciding whether the candidate vertical axis of symmetry and the candidate horizontal axis of symmetry are approximately perpendicular to each other and when deciding that the two candidate axes of symmetry are approximately perpendicular to each other, shaping the two candidate axes of symmetry to be precisely perpendicular to each other, symmetry decision line segment calculating measure mesh generating means for generating a lattice forming a rectangular measure mesh which will cover the input figure, with two perpendicular candidate axes of symmetry shaped by the orthogonal axis of symmetry decision means as the origin, symmetry decision line segment calculating means for, with respect to each of the shaped candidate vertical axis of symmetry and candidate horizontal axis of symmetry, tracing points of intersection of the curve and the lattice forming a measure mesh from one of characteristic points at which the candidate axis of symmetry passes toward the other characteristic point, calculating a pair of intersection points located on opposite sides of the candidate axis of symmetry which are to be a reference for deciding about symmetry of the input figure and linking the pair of intersection points by a straight line to generate a symmetry decision line segment for use in deciding about symmetry of the input figure, distance of axis of symmetry calculating means for calculating, in a relationship between the candidate vertical axis of symmetry and a symmetry decision line segment generated based on the candidate vertical axis of symmetry and in a relationship between the candidate horizontal axis of symmetry and a symmetry decision line segment generated based on the candidate horizontal axis of symmetry, a distance between a mid-point of each of the symmetry decision line segments and the candidate axis of symmetry corresponding thereto, angle of axis of symmetry calculating means for calculating, in a relationship between the candidate vertical axis of symmetry and a symmetry decision line segment generated based on the candidate vertical axis of symmetry and in a relationship between the candidate horizontal axis of symmetry and a symmetry decision line segment generated based on the candidate horizontal axis of symmetry, an angle of the intersection of each of the symmetry decision line segments and the candidate axis of symmetry corresponding thereto to calculate a difference in angle between the angle of the intersection and a predetermined angle, symmetry decision means for calculating, for each the candidate axis of symmetry and each the symmetry decision line segment corresponding thereto, dispersion of all the values of a distance between a midpoint of the symmetry decision line segment and the candidate axis of symmetry calculated by the distance of axis of symmetry calculating means and dispersion of all the differences in angle calculated by the angle of axis of symmetry calculating means to decide about symmetry of the input figure according to the calculated dispersion of the parameters, and symmetrization processing means for changing coordinates of a pair of points of intersection of the curve and lattice and coordinates of characteristic points such that the input figure is precisely axisymmetric with respect to the candidate vertical axis of symmetry and the candidate horizontal axis of symmetry when a decision is made by the symmetry decision means that the input figure has symmetry with respect to both of the candidate vertical axis of symmetry and the candidate horizontal axis of symmetry.

The angle of axis of symmetry calculating means calculates a difference in angle between an angle of the intersection of the symmetry decision line segment and the candidate axis of symmetry and 90 degrees as the predetermined angle.

In the preferred construction, in the processing for the candidate vertical axis of symmetry and the processing for the candidate horizontal axis of symmetry, the symmetry decision line segment calculating means, the distance of axis of symmetry calculating means, the angle of axis of symmetry calculating means and the symmetry decision means are used in common.

The data processing means comprises validity of decision line segment determining means for determining whether the symmetry decision line segment itself has symmetry with respect to the candidate axis of symmetry based on parameters calculated by the distance of axis of symmetry calculating means and the angle of axis of symmetry calculating means.

The data processing means comprises axis of symmetry for shaping determining means for determining, when the symmetry decision means decides that there exist a plurality of candidate axes of symmetry appropriate as an axis of symmetry of the input figure, which candidate axis of symmetry is to be used to conduct symmetric shaping of the input figure.

In the preferred construction, the axisymmetric figure shaping device further comprises measure mesh size designating means for designating the size of a measure mesh formed of a lattice generated by the symmetry decision line segment calculating measure mesh generating means.

In the preferred construction, the axisymmetric figure shaping device further comprises reference element designating means for designating a reference element for use in symmetric shaping processing of the input figure by the symmetrization processing means.

In the preferred construction, the axisymmetry figure shaping device further comprises second symmetrization processing means for shaping the input figure, when a decision is made by the symmetry decision means that the input figure has symmetry with respect to only either the candidate vertical axis of symmetry or the candidate horizontal axis of symmetry, so as to be precisely axisymmetric with respect to the candidate axis of symmetry to which the decision is made that the input figure has symmetry.

In the preferred construction, the axisymmetric figure shaping device further comprises reference element designating means for designating a reference element for use in symmetric shaping processing of the input figure by the second symmetrization processing means.

According to the third aspect of the invention, an axisymmetric figure shaping device for shaping an input figure into a figure axisymmetric with respect to a predetermined axis of symmetry, comprises input means for receiving input of a figure formed including a curve, data processing means for shaping an input figure to be precisely symmetric with respect to a predetermined axis of symmetry, storage means for storing at least an input figure, a figure having been shaped and information regarding characteristic points of these figures, and output means for displaying an input figure and a figure having been shaped, the data processing means comprising
characteristic point calculating means for calculating, from a coordinate point sequence of a figure input through the input means, coordinates of each vertex, maximal and minimal points in the horizontal and the vertical directions of the input figure and taking them as characteristic points of the input figure, candidate axis of symmetry calculating means for calculating a candidate axis of symmetry for use in the decision of symmetry based on characteristic points calculated by the characteristic point calculating means, symmetry decision means for deciding about symmetry of the input figure with respect to the candidate axis of symmetry calculated by the candidate axis of symmetry calculating means, and shaping means for shaping the input figure, when a decision is made by the symmetry decision means that the input figure has symmetry with respect to the candidate axis of symmetry, so as to be precisely axisymmetric with respect to the candidate axis of symmetry.

The candidate axis of symmetry calculating means calculates a pair of perpendicular candidate axes of symmetry for use in the decision of symmetry based on characteristic points calculated by the characteristic point calculating means, the symmetry decision means decides about symmetry of the input figure with respect to each of the two candidate axes of symmetry calculated by the means for calculating a pair of candidate axes of symmetry, and the shaping means shapes the input figure, when a decision is made by the means for deciding about symmetry that the input figure has symmetry with respect to both of the two candidate axes of symmetry, so as to be precisely axisymmetric with respect to both of the two candidate axes of symmetry.

According to the forth aspect of the invention, an axisymmetric figure shaping method of shaping an input figure into a figure axisymmetric with respect to a predetermined axis of symmetry, comprising the steps of:

calculating, from a coordinate point sequence of a figure input through the input means, coordinates of each vertex, maximal and minimal points in the horizontal and the vertical directions of the input figure and taking them as characteristic points of the input figure, calculating a candidate axis of symmetry according to predetermined rules based on calculated characteristic points, extracting, from all the calculated candidate axes of symmetry, candidate axes of symmetry for use in the decision of symmetry, one closest to the horizontal and the other closest to the vertical, selecting an arbitrary one of calculated two candidate axes of symmetry to generate a lattice forming a rectangular measure mesh which will cover the input figure centered around the selected candidate axis of symmetry, tracing points of intersection of the curve and the lattice forming a measure mesh from one of characteristic points at which a selected candidate axis of symmetry passes toward the other characteristic point, calculating a pair of intersection points located on opposite sides of the candidate axis of symmetry which are to be a reference for deciding about symmetry of the input figure and linking the pair of intersection points by a straight line to generate a symmetry decision line segment for use in deciding about symmetry of the input figure, calculating a distance between a mid-point of the symmetry decision line segment and the candidate axis of symmetry, calculating an angle of the intersection of the symmetry decision line segment and the candidate axis of symmetry to calculate a difference in angle between the angle of the intersection and 90 degrees, calculating dispersion of all the calculated values of a distance between a mid-point of the symmetry decision line segment and a candidate axis of symmetry and dispersion of all the calculated differences in angle to decide about symmetry of the input figure according to the calculated dispersion of the parameters, and changing coordinates of a pair of points of intersection of the curve and lattice and coordinates of characteristic points such that the input figure is precisely axisymmetric with respect to the candidate axis of symmetry when a decision is made that the input figure has symmetry.

In the preferred construction, a decision whether the symmetry decision line segment itself has symmetry with respect to the candidate axis of symmetry is made based on parameters calculated at the distance of axis of symmetry calculating step and the angle of axis of symmetry calculating step.

In the preferred construction, when the decision is made that there exist a plurality of candidate axes of symmetry appropriate as an axis of symmetry of the input figure at the symmetry deciding step, determination is made which candidate axis of symmetry is to be used to conduct symmetric shaping of the input figure.

According to a further aspect of the invention, an axisymmetric figure shaping method of shaping an input figure into a figure axisymmetric with respect to a predetermined axis of symmetry, comprising the steps of:

calculating, from a coordinate point sequence of an input figure, coordinates of each vertex, and maximal and minimal points in the horizontal and the vertical directions of the input figure and taking them as characteristic points of the input figure, calculating a candidate axis of symmetry according to predetermined rules based on calculated characteristic points, extracting, from all the calculated candidate axes of symmetry, a candidate vertical axis of symmetry as a candidate axis of symmetry closest to the vertical, extracting, from all the calculated candidate axes of symmetry, a candidate horizontal axis of symmetry based on an extracted candidate vertical axis of symmetry, deciding whether the candidate vertical axis of symmetry and the candidate horizontal axis of symmetry are approximately perpendicular to each other and when a decision is made that the two candidate axes of symmetry are approximately perpendicular to each other, shaping the two candidate axes of symmetry to be precisely perpendicular, generating a lattice forming a rectangular measure mesh which will cover the input figure, with a point of intersection of shaped two perpendicular candidate axes of symmetry as the origin, with respect to each of the shaped candidate vertical axis of symmetry and candidate horizontal axis of symmetry, tracing points of intersection of the curve and the lattice forming a measure mesh from one of characteristic points at which the candidate axis of symmetry passes toward the other characteristic point, calculating a pair of intersection points located on opposite sides of the candidate axis of symmetry which are to be a reference for deciding about symmetry of the input figure and linking the pair of intersection points by a straight line to generate a symmetry decision line segment for use in deciding about symmetry of the input figure, in a relationship between the candidate vertical axis of symmetry and a symmetry decision line segment generated based on the candidate vertical axis of symmetry and in a relationship between the candidate horizontal axis of symmetry and a symmetry decision line segment generated based on the candidate horizontal axis of symmetry, calculating a distance between a mid-point of each of the symmetry decision line segments and the candidate axis of symmetry corresponding thereto, in a relationship between the candidate vertical axis of symmetry and a symmetry decision line segment generated based on the candidate vertical axis of symmetry and in a relationship between the candidate horizontal axis of symmetry and a symmetry decision line segment generated based on the candidate horizontal axis of symmetry, calculating an angle of the intersection of each the symmetry decision line segment and the candidate axis of symmetry corresponding thereto to calculate a difference in angle between the angle of the intersection and 90 degrees, for each the candidate axis of symmetry and each the symmetry decision line segment corresponding thereto, calculating dispersion of all the calculated values of a distance between a mid-point of the symmetry decision line segment and the candidate axis of symmetry and dispersion of all the calculated differences in angle to decide about symmetry of the input figure according to the calculated dispersion of the parameters, and changing coordinates of a pair of points of intersection of the curve and lattice and coordinates of characteristic points such that the input figure is precisely axisymmetric with respect to the candidate vertical axis of symmetry and the candidate horizontal axis of symmetry when a decision is made that the input figure has symmetry with respect to both of the candidate vertical axis of symmetry and the candidate horizontal axis of symmetry.

The angle of axis of symmetry calculating step calculates a difference in angle between an angle of the intersection of the symmetry decision line segment and the candidate axis of symmetry and 90 degrees as the predetermined angle.

In the preferred construction, a decision is made whether the symmetry decision line segment itself has symmetry with respect to the candidate axis of symmetry based on parameters calculated at the distance of axis of symmetry calculating step and the angle of axis of symmetry calculating step.

In the preferred construction, when the decision is made that there exist a plurality of candidate axes of symmetry appropriate as an axis of symmetry of the input figure, determination is made which candidate axis of symmetry is to be used to conduct symmetric shaping of the input figure.

In another preferred construction, when a decision is made at the symmetry decision step that the input figure has symmetry with respect to only either the candidate vertical axis of symmetry or the candidate horizontal axis of symmetry, the input figure is shaped so as to be precisely axisymmetric with respect to the candidate axis of symmetry to which the decision is made that the input figure has symmetry.

According to a still further aspect of the invention, an axisymmetric figure shaping method of shaping an input figure into a figure axisymmetric with respect to a predetermined axis of symmetry, comprising the steps of:

calculating, from a coordinate point sequence of a figure formed including a curve and input through the input means, coordinates of each vertex, maximal and minimal points in the horizontal and the vertical directions of the input figure and taking them as characteristic points of the input figure, calculating a candidate axis of symmetry for use in the decision of symmetry based on calculated characteristic points, deciding about symmetry of the input figure with respect to the calculated candidate axis of symmetry, and when a determination is made in the decision that the input figure has symmetry with respect to the candidate axis of symmetry, shaping the input figure so as to be precisely axisymmetric with respect to the candidate axis of symmetry.

In the preferred construction, at the candidate axis of symmetry calculating step, a pair of perpendicular candidate axes of symmetry for use in the decision of symmetry is calculated based on calculated characteristic points, at the symmetry decision step, decision is made about symmetry of the input figure with respect to each of the two candidate axes of symmetry calculated by the means for calculating a pair of candidate axes of symmetry, and at the shaping step, when a determination is made by the decision by the means for deciding about symmetry that the input figure has symmetry with respect to both of the two candidate axes of symmetry, the input figure is shaped so as to be precisely axisymmetric with respect to both of the two candidate axes of symmetry.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 19 is a diagram showing an example of an input figure to be processed according to the present embodiment and an example of the figure having been shaped.

FIG. 20 is a diagram showing a method of calculating a candidate axis of symmetry based on the input figure of FIG. 19.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
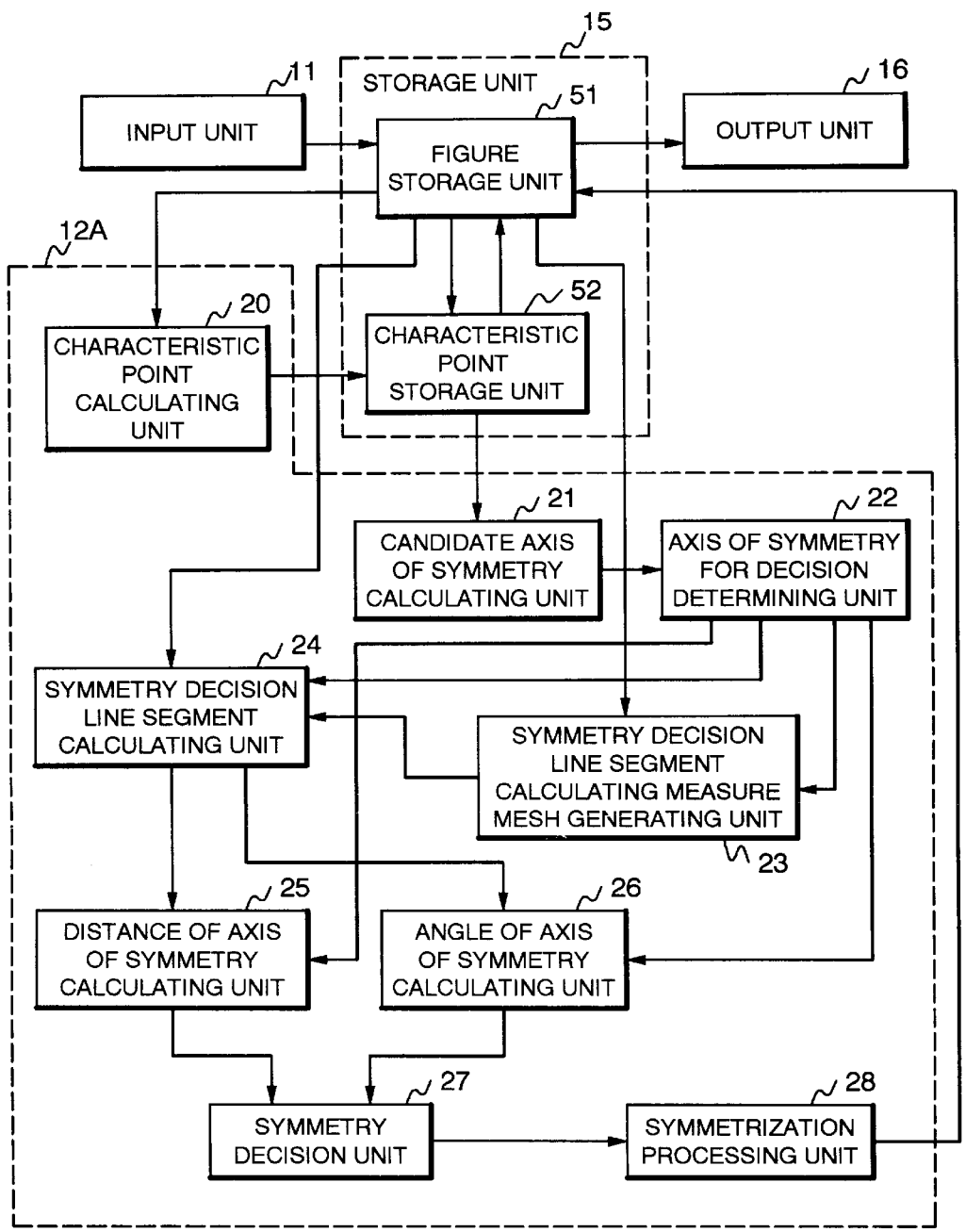
FIG. 1 is a block diagram showing structure of an axisymmetric figure shaping device according to a first embodiment of the present invention.

Embodiments of the present invention will be described in detail with reference to the drawings. While in the following, description will be given of a case where a curvilinear figure is an object of shaping processing, the present embodiments are capable of conducting the same shaping processing also for a linear figure formed only of straight lines and for a figure including both a curve and a straight line with the need of neither special structure nor processing. FIG. 1 is a block diagram showing structure of an axisymmetric figure shaping device according to a first embodiment of the present invention.

As illustrated in FIG. 1, the axisymmetric figure shaping device of the first embodiment includes an input unit 11 for receiving input of a figure, a data processing unit 12A for shaping a figure, a storage unit 15 for storing figure information and characteristic points, and an output unit 16 for outputting an input figure and a figure having been shaped. In FIG. 1, illustration is made only of a characteristic part of the structure of the present embodiment and that of the remaining common part is omitted.

In the above-described structure, the input unit 11 is implemented by a pointing device such as a mouse or a pen tablet, a keyboard or the like. The data processing unit 12A is implemented by a program-controlled CPU or the like. The storage unit 15 is implemented by an internal memory such as a RAM or an external storage device such as a magnetic disk device. The output unit 16 is implemented by a display device or a printer.

The data processing unit 12A, as illustrated in the figure, includes a characteristic point calculating unit 20, a candidate axis of symmetry calculating unit 21, an axis of symmetry for decision determining unit 22, a symmetry decision line segment calculating measure mesh generating unit 23, a symmetry decision line segment calculating unit 24, a distance of axis of symmetry calculating unit 25, an angle of axis of symmetry calculating unit 26, a symmetry decision unit 27, and a symmetrization processing unit 28. The storage unit 15 includes a figure storage unit 51 and a characteristic point storage unit 52.

The data processing unit 12A is provided with a readable memory which stores a program for implementing the respective functions of the above-described components. The readable memory may be a storage medium such as a magnetic disk or a semiconductor memory.

Detailed description will be given of the data processing unit 12A. In the above structure, a figure input through the input unit 11 is stored in the figure storage unit 51 as a coordinate point sequence tracing a locus of a curve.

The characteristic point calculating unit 20 calculates coordinates of a vertex and maximal and minimal points in the horizontal direction or the vertical direction from the input coordinate point sequence stored in the figure storage unit 51 and stores them as characteristic points of the input figure in the characteristic point storage unit 52. The figure stored in the figure storage unit 51 and the characteristic points stored in the characteristic point storage unit 52 are correlated with each other.

The candidate axis of symmetry calculating unit 21 calculates a candidate axis of symmetry to be used for the decision of symmetry of a figure based on the number and position of characteristic points stored in the characteristic point storage unit 52.

The axis of symmetry for decision determining unit 22 extracts, from among all the candidate axes of symmetry calculated at the candidate axis of symmetry calculating unit 21, one candidate axis of symmetry closest to the horizontal and one candidate axis of symmetry closest to the vertical.

The symmetry decision line segment calculating measure mesh generating unit 23 generates a lattice which forms a rectangular measure mesh covering the whole of an input figure centered around arbitrary one of two axes of symmetry calculated at the axis of symmetry for decision determining unit 22.

The symmetry decision line segment calculating unit 24 first traces points of intersection of a curve and a lattice forming a measure mesh from one of two characteristic points at which one candidate axis of symmetry selected by the symmetry decision line segment calculating measure mesh generating unit passes toward the other characteristic point and calculates a pair of the points of intersection to be a reference for deciding about symmetry of an input figure. Then, the unit 24 links the pair of points of intersection by a straight line to generate a symmetry decision line segment for use in the decision of symmetry.

The distance of axis of symmetry calculating unit 25 calculates a distance between a mid-point of a symmetry decision line segment and a candidate axis of symmetry. The angle of axis of symmetry calculating unit 26 calculates an angle between a symmetry decision line segment and a candidate axis of symmetry to calculate a difference in angle between the angle and 90 degrees.

The symmetry decision unit 27 calculates dispersion of all the values of distance between mid-points of symmetry decision line segments and a candidate axis of symmetry calculated at the distance of axis of symmetry calculating unit 25 and calculates dispersion of all the differences in angle between angles between the symmetry decision line segments and a candidate axis of symmetry and 90 degrees calculated by the angle of axis of symmetry calculating unit 26 to decide about axisymmetry of an input figure based on calculation results.

That a figure has axisymmetry here indicates that the figure is an axisymmetric figure or has a form approximate to a predetermined axisymmetric figure. A figure decided to have axisymmetry therefore can be shaped into an axisymmetric form with respect to a predetermined axis of symmetry, except when it has a precisely axisymmetric form. When a figure has a precisely axisymmetric form, no shaping is necessary.

The symmetrization processing unit 28 transforms an input figure decided to have axisymmetry by the symmetry decision unit 27 into a figure precisely axisymmetric with respect to a candidate axis of symmetry. More specifically, the unit 28 appropriately modifies coordinates of a pair of points of intersection of a curve and a lattice calculated at the symmetry decision line segment calculating unit 24 and coordinates of a characteristic point calculated at the characteristic point calculating unit 20. A figure generated by the transformation of the input figure is stored in the figure storage unit 51.

The figure having been transformed which is stored in the figure storage unit 51 is output to the output unit 16. In this case, a curve forming the output figure is output as an approximate curve (e.g. spline curve) having, as characteristic points, points of intersection of the curve and the lattice and characteristic points used in the transformation by the symmetrization processing unit 28.

Figure 2:
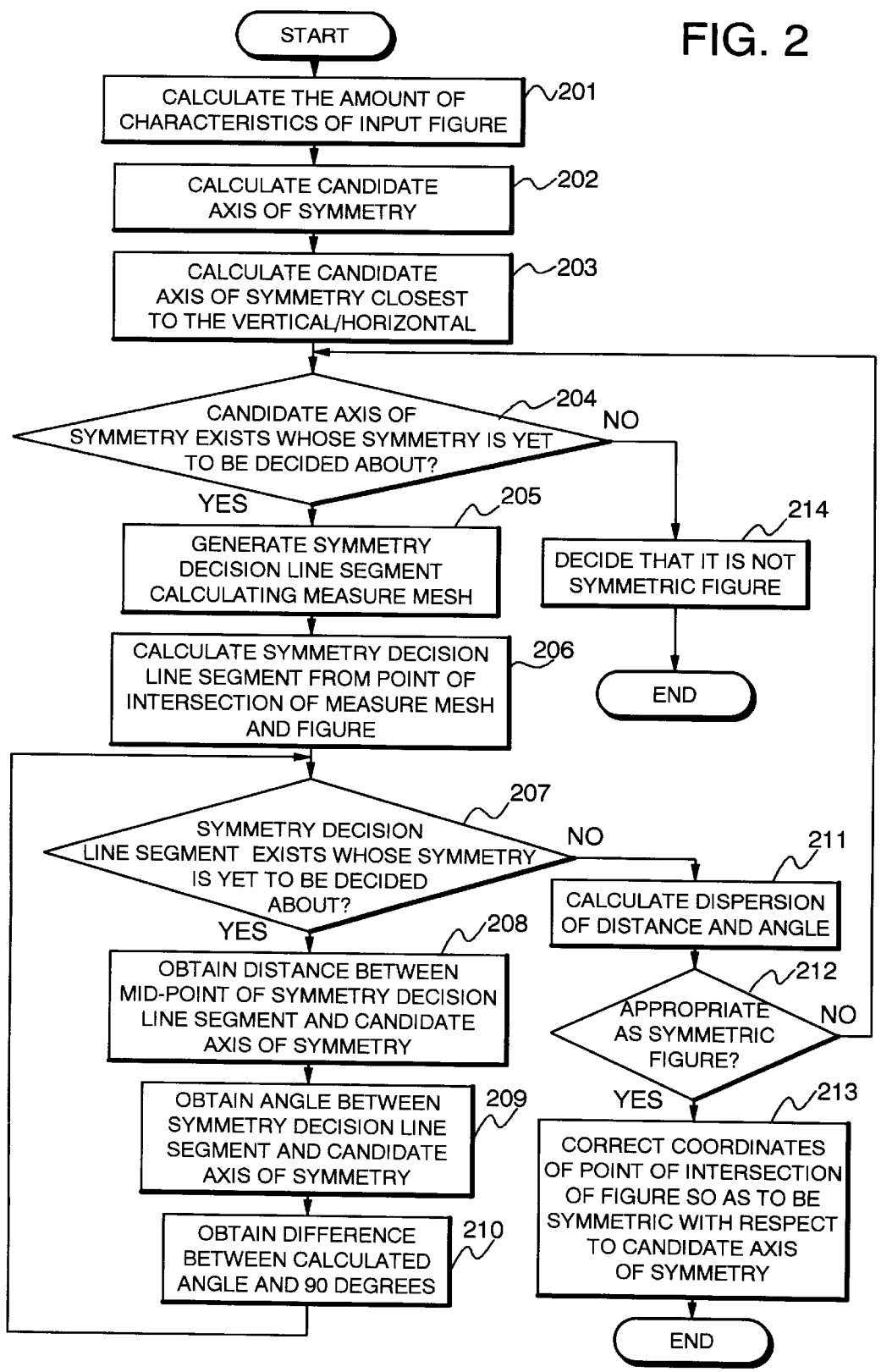
FIG. 2 is a flow chart showing operation of the first embodiment.
Figure 3A:
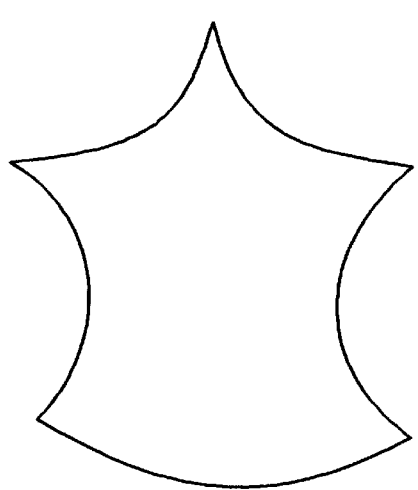
FIG. 3 is a diagram showing an example of an input figure to be processed in the present embodiment and an example of the figure having been shaped.
Figure 3B:
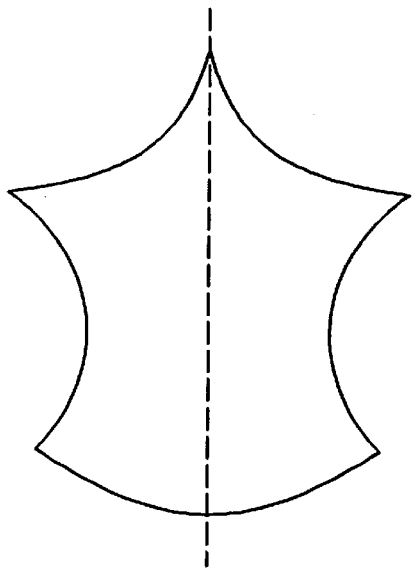
Figure 4:
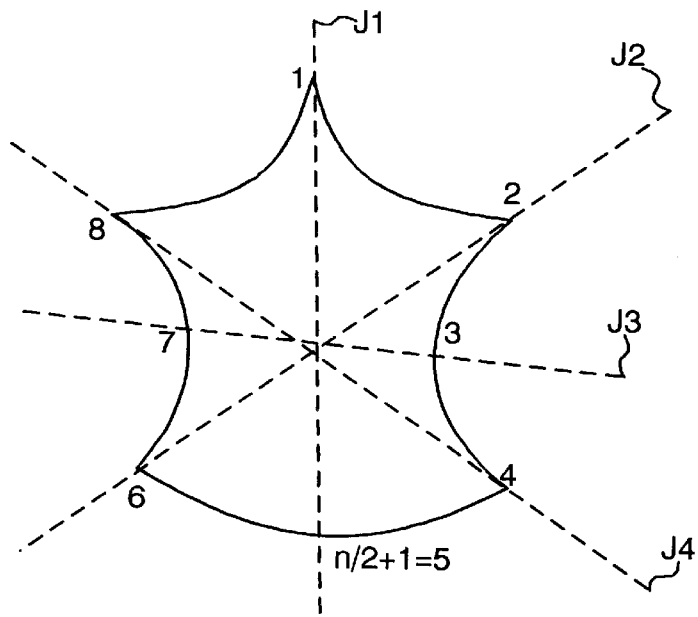
FIG. 4 is a diagram showing a method of calculating a candidate axis of symmetry based on the input figure of FIG. 3.
Figure 5:
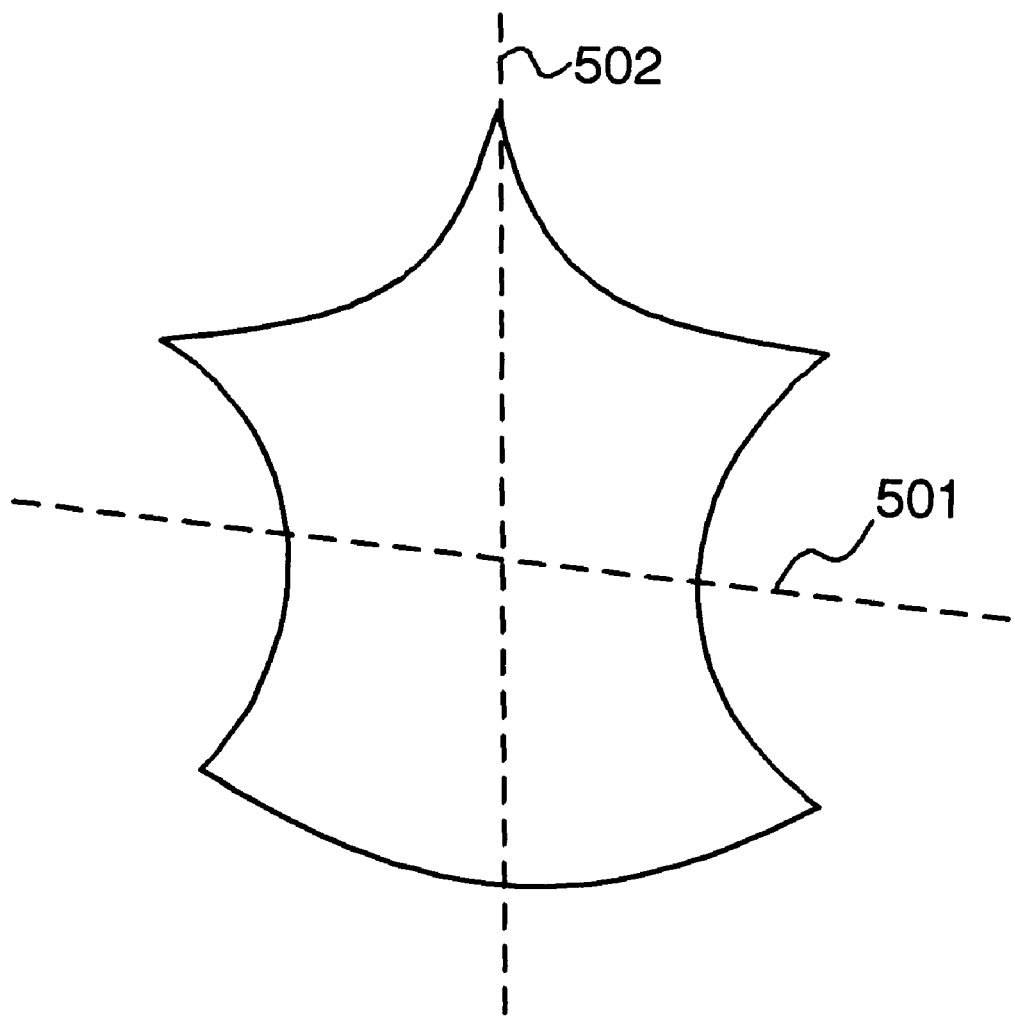
FIG. 5 is a diagram showing a candidate horizontal axis of symmetry and a candidate vertical axis of symmetry calculated among the candidate axes of symmetry shown in FIG. 4.
Figure 6:
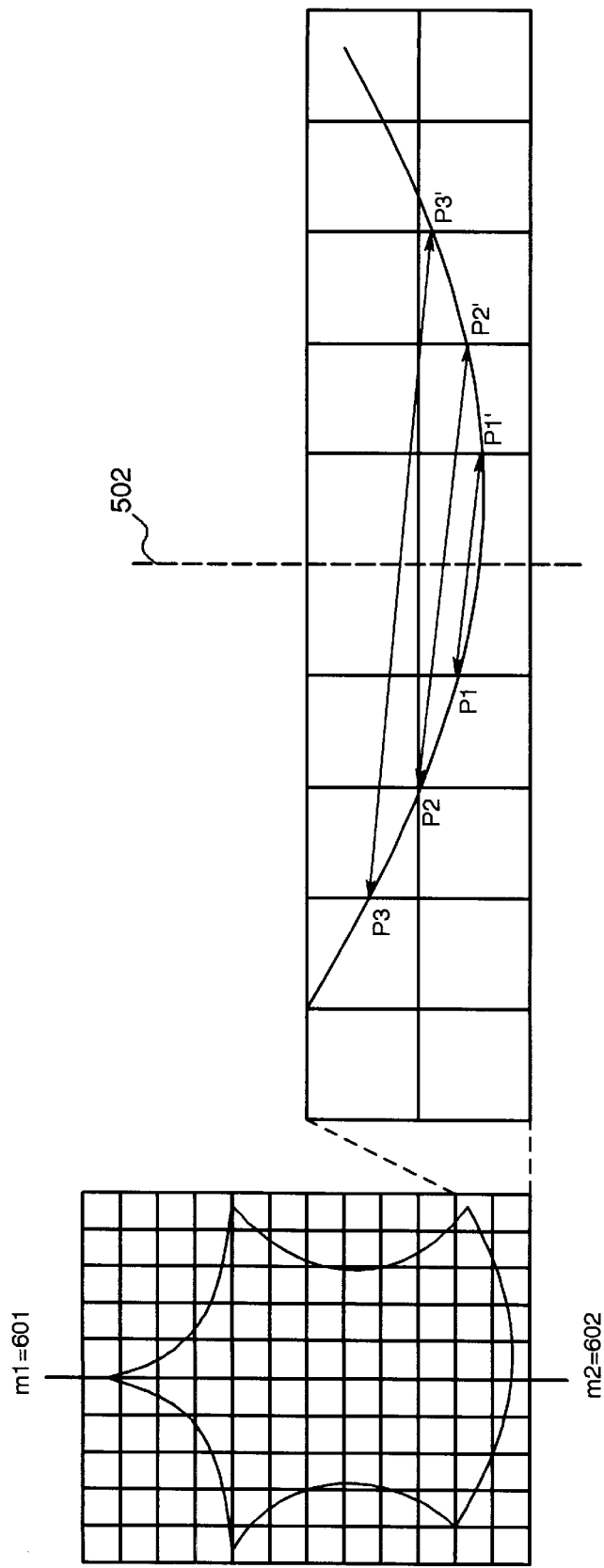
FIG. 6 is a diagram showing an example of a measure mesh covering the input figure of FIG. 3.
Figure 7:
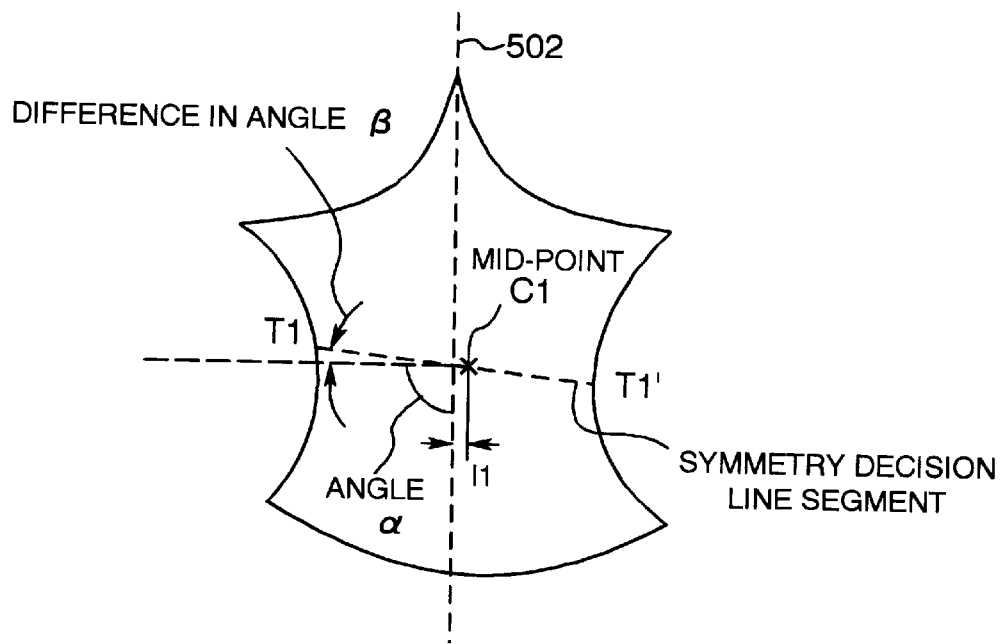
FIG. 7 is a diagram showing a method of deciding about symmetry using a candidate axis of symmetry and a symmetry decision line segment.

Next, with reference to FIGS. 1 to 7, operation of the present embodiment will be described. FIG. 2 is a flow chart showing a flow of processing of the present embodiment. FIG. 3 is a diagram showing an input figure (A) to be processed according to the present embodiment and a figure (B) obtained by shaping the input figure. FIG. 4 is a diagram showing candidate axes of symmetry calculated by the candidate axis of symmetry calculating unit 21. FIG. 5 is a diagram showing candidate axes of symmetry extracted among the candidate axes of symmetry shown in FIG. 4 by the axis of symmetry for decision determining unit 22. FIG. 6 includes a diagram (A) showing a lattice generated by the symmetry decision line segment calculating measure mesh generating unit 23 and a diagram (B) showing an expanded main part of the diagram (A). FIG. 7 is a diagram showing a symmetry deciding method using a symmetry decision line segment.

A figure input through the input unit 11 is stored in the figure storage unit 51 as an input coordinate point sequence tracing a locus of a curve. The characteristic point calculating unit 20 calculates coordinates of a vertex and maximal and minimal points in the horizontal and the vertical out of the input coordinate point sequence and stores them in the characteristic point storage unit 52 as the characteristic points of the input figure (Step 201). In a case of such an input figure as shown in FIG. 3(A), eight characteristic points are calculated as shown in FIG. 4. The input figure is also output to the output unit 16.

Next, with respect to an input figure whose characteristic points number n, the candidate axis of symmetry calculating unit 21 pairs a m-th (m=1, 2, . . . ) characteristic point counted from an arbitrary characteristic point with a (n/2+m)th characteristic point with reference to the characteristic points stored in the characteristic point storage unit 52 to take a straight line linking each pair as a candidate axis of symmetry (Step 202). In a case of the input figure as shown in FIG. 3(A), four candidate axes of symmetry, J1 to J4, are calculated as illustrated in FIG. 4. In a case where a number n of the characteristic points is an odd number, number is discarded below the decimal point of n/2 which is for use in specifying characteristic points for calculating a candidate axis of symmetry. That is, In a case where a number n of the characteristic points is an odd number, a decision can be made that the input figure has not axisymmetry.

Next, the axis of symmetry for decision determining unit 22 extracts, among all the candidate axes of symmetry calculated at the candidate axis of symmetry calculating unit 21, one candidate axis of symmetry closest to the horizontal and one candidate axis of symmetry closest to the vertical (Step 203). With the candidate axes of symmetry shown in FIG. 4 as an example, the candidate axis of symmetry J3 closest to the horizontal and the candidate axis of symmetry J1 closest to the vertical are selected to extract two candidate axes of symmetry, a candidate horizontal axis of symmetry 501 and a candidate vertical axis of symmetry 502, as shown in FIG. 5. The axis of symmetry for decision determining unit 22 shapes the extracted candidate axes of symmetry to be precisely horizontal or vertical.

Next, arbitrary one of the shaped candidate axes of symmetry is selected to conduct the following processing.

First, the symmetry decision line segment calculating measure mesh generating unit 23 generates a lattice forming a rectangular measure mesh which will cover the input figure centered around the candidate axis of symmetry (Step 205). An example of a lattice generated with respect to the candidate vertical axis of symmetry 502 of FIG. 5 is shown in FIG. 6(A). In this example, fineness of a measure mesh formed by the lattice can be arbitrarily set. The finer a measure mesh is, the more precise a symmetry decision can be, and the wider the measure mesh is, the more the decision processing speed can be improved.

Then, the symmetry decision line segment calculating unit 24 traces points of intersection of the curve and the lattice located on opposite sides of the candidate vertical axis of symmetry 502 from one of the characteristic points at which the candidate vertical axis of symmetry 502 passes toward the other point. While tracing the points of intersection, the unit 24 generates a line segment linking the n-th (n=1, 2, . . . ) points of intersection with each other. The generated line segment is regarded as a symmetry decision line segment (Step 206).

With reference to FIG. 6(B) which is an expansion of the main part of FIG. 6(A), a line segment P1-P1' linking points of intersection P1 and P1' located on the opposite sides of a characteristic point 601 on the candidate vertical axis of symmetry 502, a line segment P2-P2' linking points of intersection P2 and P2' and a line segment P3-P3' linking points of intersection P3 and P3' are regarded as symmetry decision line segments. Pairs of points of intersection will be thus selected until the points of intersection reach the other characteristic point 602 to generate a symmetry decision line segment.

Next, the distance of axis of symmetry calculating unit 25 calculates coordinates of a mid-point of each symmetry decision line segment calculated by the symmetry decision line segment calculating unit 24 to calculate a distance between the calculated mid-point of the symmetry decision line segment and the candidate vertical axis of symmetry 502 (Step 208). The angle of axis of symmetry calculating unit 26 calculates an angle between each symmetry decision line segment and the candidate vertical axis of symmetry 502 to calculate an angle difference (absolute value) from 90 degrees (Steps 209 and 210). With reference to FIG. 7, the distance of axis of symmetry calculating unit 25 obtains coordinates of a mid-point C1 of a symmetry decision line segment T1-T1' to calculate a distance l1 between the candidate vertical axis of symmetry 502 and the mid-point C1. The angle of axis of symmetry calculating unit 26 obtains an angle α between the candidate vertical axis of symmetry 502 and the symmetry decision line segment T1-T1' to calculate a difference in angle β (=|90−α|) between 90 degrees and the angle α.

After the processing is conducted at Steps 208 to 210 with respect to all the symmetry decision line segments, the symmetry decision unit 27 calculates dispersion of the calculated distances and angle differences (Steps 207 and 211). For calculating dispersion, various methods can be employed such as comparison with a mean value and calculation of variance. When a means value or variance is used for calculating dispersion, the more approximate to "0" a value is, the more a figure is highly symmetric. In other words, it is approximate to a symmetric form. Therefore, when a value of calculated dispersion is within an arbitrarily set threshold value, a decision can be made that the candidate vertical axis of symmetry 502 is appropriate as an axis of symmetry of an input figure, that is, the input figure has axisymmetry with respect to the candidate vertical axis of symmetry 502.

When the symmetry decision unit 27 decides that the input figure has axisymmetry, the symmetrization processing unit 28 corrects, such that each of pairs of points of intersection of the curve and the lattice calculated at the symmetry decision line segment calculating unit 24 and characteristic points are each located at a position precisely symmetric with respect to the candidate vertical axis of symmetry 502, coordinates of the points of intersection and the characteristic points (Steps 212 and 213). Then, the unit 28 stores a shaped figure formed by the corrected points of intersection and characteristic points in the figure storage unit 51. The shaped figure stored in the figure storage unit 51 is expressed as an approximate curve (e.g. spline curve) having the corrected points of intersection and characteristic points as characteristic points and is output to the output unit 16. In the illustrated example, the shaped figure shown in FIG. 3(B) is output in place of the input figure shown in FIG. 3(A).

On the other hand, when a decision is made at Step 212 that the input figure is not symmetric with respect to the candidate vertical axis of symmetry 502, the processing at Steps 205 to 212 will be repeated with respect to the remaining candidate horizontal axis of symmetry 501. When the decision is made that the input figure is not symmetric with respect to neither of the candidates axes of symmetry, the determination is made that the input figure is not an axisymmetric figure (Steps 204 and 214).

The above-described axisymmetric figure shaping device according to the first embodiment makes it possible to automatically extract an axis of symmetry from a curvilinear figure input by a user to shape the input figure into a figure precisely axisymmetric with respect to at least one axis of symmetry.

Figure 8:
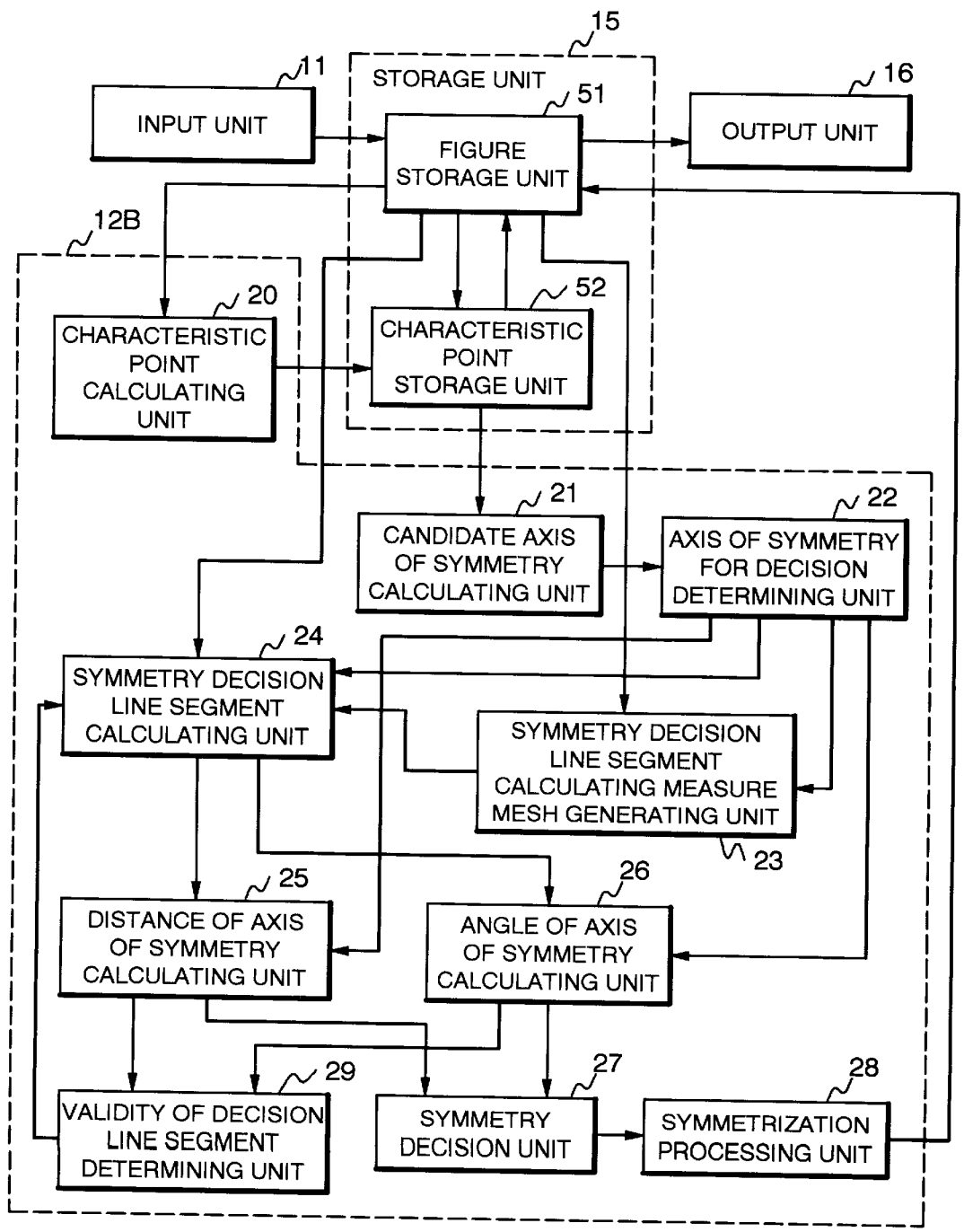
FIG. 8 is a block diagram showing structure of an axisymmetric figure shaping device according to a second embodiment of the present invention.

FIG. 8 is a block diagram showing structure of an axisymmetric figure shaping device according to a second embodiment of the present invention.

As illustrated in FIG. 8, the axisymmetric figure shaping device of the second embodiment includes an input unit 11 for receiving input of a figure, a data processing unit 12B for shaping a figure, a storage unit 15 for storing figure information and characteristic points, and an output unit 16 for outputting an input figure and a figure having been shaped. The data processing unit 12B includes a characteristic point calculating unit 20, a candidate axis of symmetry calculating unit 21, an axis of symmetry for decision determining unit 22, a symmetry decision line segment calculating measure mesh generating unit 23, a symmetry decision line segment calculating unit 24, a distance of axis of symmetry calculating unit 25, an angle of axis of symmetry calculating unit 26, a symmetry decision unit 27, a symmetrization processing unit 28, and a validity of decision line segment deciding unit 29. The storage unit 15 includes a figure storage unit 51 and a characteristic point storage unit 52. In FIG. 8, illustration is made only of a characteristic part of the structure of the present embodiment and that of the remaining common part is omitted.

In the above-described structure, the input unit 11, the storage unit 15 and the output unit 16 are similarly structured to their counterparts of the first embodiment shown in FIG. 1. In the structure of the data processing unit 12B, the components other than the validity of decision line segment deciding unit 29 are similarly structured to their counterparts in the data processing unit 12A of the first embodiment shown in FIG. 1 and are accordingly allotted the same reference numerals to omit their description. The data processing unit 12B is provided with a readable memory which stores a program for implementing the respective functions of the above-described components. The readable memory may be a storage medium such as a magnetic disk or a semiconductor memory.

The validity of decision line segment deciding unit 29 obtains calculation results of the distance of axis of symmetry calculating unit 25 and the angle of axis of symmetry calculating unit 26 and sees if each calculation result falls within a range of a preset threshold value to decide about symmetry of the symmetry decision line segment itself. The validity of decision line segment deciding unit 29 part decides symmetry of all the generated symmetry decision line segments one by one. With respect to all the symmetry decision line segments, when a decision is made that symmetry of the symmetry decision line segment is valid because each calculation result of the distance of axis of symmetry calculating unit 25 and the angle of axis of symmetry calculating unit 26 falls within the range of the threshold value, the routine proceeds to the calculation of dispersion of the calculation results obtained by the distance of axis of symmetry calculating unit 25 and the angle of axis of symmetry calculating unit 26 by the symmetry decision unit 27. On the other hand, with respect to any of the symmetry decision line segments, when a decision is made that symmetry of the symmetry decision line segment is not valid because any of the calculation results obtained by the distance of axis of symmetry calculating unit 25 and the angle of axis of symmetry calculating unit 26 exceeds the threshold value, the routine proceeds to the processing with respect to another candidate axis of symmetry without conducting the following processing.

Next, operation of the present embodiment will be described with reference to the flow chart of FIG. 9.

Figure 9:
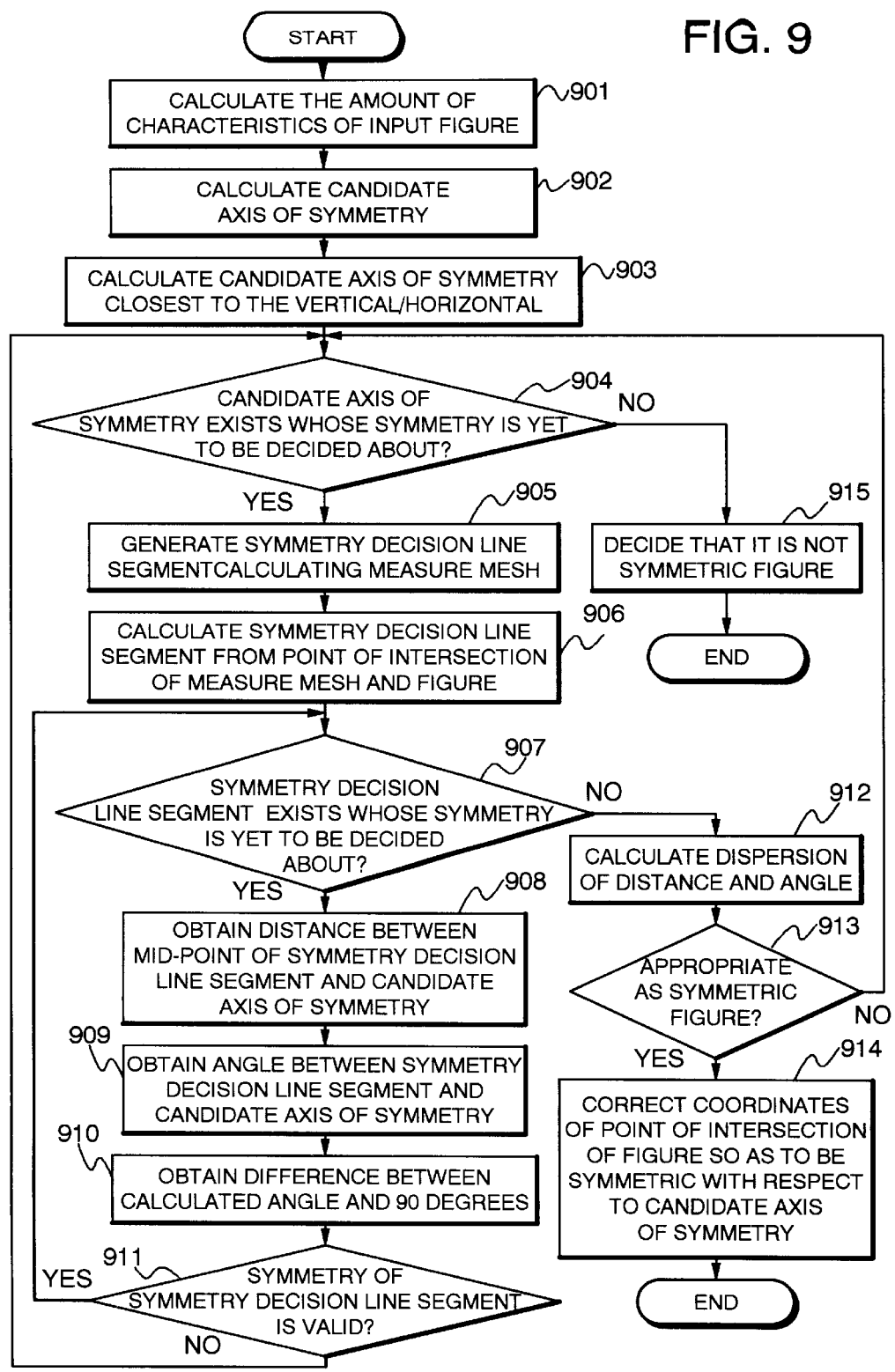
FIG. 9 is a flow chart showing operation of the second embodiment.

In FIG. 9, operation at Steps 901 to 910 is the same as that at Steps 201 to 210 according to the first embodiment shown in FIG. 2 and therefore no description will be made thereof.

After calculation results are obtained by the distance of axis of symmetry calculating unit 25 and the angle of axis of symmetry calculating unit 26 (Steps 908 and 910), the validity of decision line segment deciding unit 29 decides on symmetry of a symmetry decision line segment itself prior to the decision on symmetry of an input figure by the symmetry decision unit 27 (Step 911). The symmetry is decided one by one for all the generated symmetry decision line segments (Steps 907 to 911). When the decision is made that the symmetry of all the generated symmetry decision line segments is valid, the routine proceeds to the calculation of dispersion of the calculation results obtained by distance of axis of symmetry calculating unit 25 and the angle of axis of symmetry calculating unit 26 and the decision on symmetry by the symmetry decision unit 27 (Steps 907 and 912).

The subsequent operation at Steps 912 to 914 shown in FIG. 9 is the same as that at Steps 211 to 213 according to the first embodiment shown in FIG. 2 and therefore no description will be made thereof.

On the other hand, when the decision is made that symmetry of any of the generated symmetry decision line segments is invalid, the routine returns to Step 904 to proceed to the processing for another candidate axis of symmetry. When the decision is ultimately made that the input figure is not symmetric with respect to any of the candidate axes of symmetry, determination is made that the input figure is not an axisymmetric figure (Steps 904 and 915).

Since the above-described axisymmetric figure shaping device according to the second embodiment decides about symmetry of a symmetry decision line segment itself prior to the decision about symmetry of a figure based on dispersion of parameters regarding the symmetry decision line segment, invalid candidate axes of symmetry can be discarded at an early stage, thereby better improving a processing speed as compared with the first embodiment.

Figure 10:
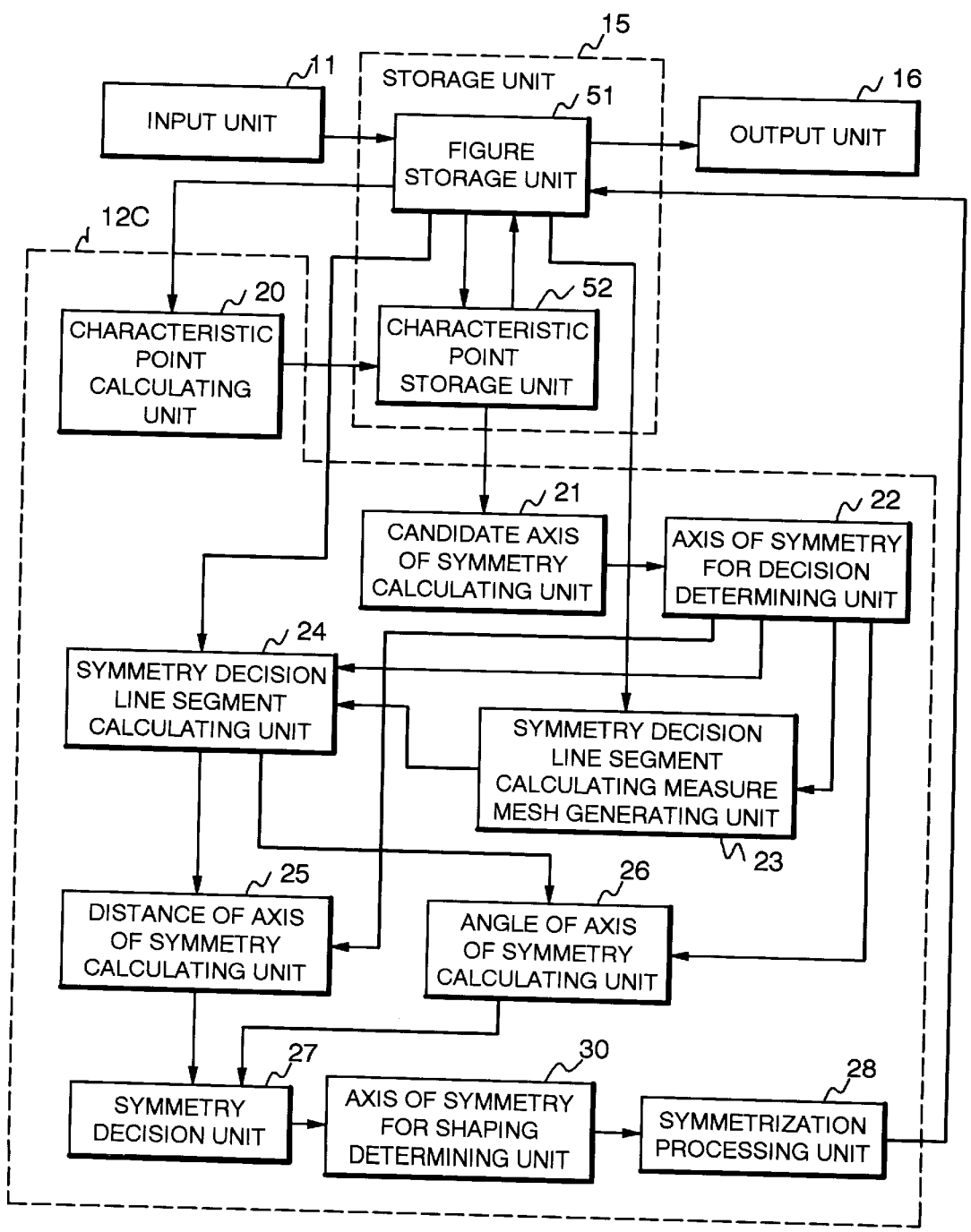
FIG. 10 is a block diagram showing structure of an axisymmetric figure shaping device according to a third embodiment of the present invention.

FIG. 10 is a block diagram showing structure of an axisymmetric figure shaping device according to a third embodiment of the present invention.

As illustrated in FIG. 10, the axisymmetric figure shaping device of the third embodiment includes an input unit 11 for receiving input of a figure, a data processing unit 12C for shaping a figure, a storage unit 15 for storing figure information and characteristic points, and an output unit 16 for outputting an input figure and a figure having been shaped. The data processing unit 12C includes a characteristic point calculating unit 20, a candidate axis of symmetry calculating unit 21, an axis of symmetry for decision determining unit 22, a symmetry decision line segment calculating measure mesh generating unit 23, a symmetry decision line segment calculating unit 24, a distance of axis of symmetry calculating unit 25, an angle of axis of symmetry calculating unit 26, a symmetry decision unit 27, a symmetrization processing unit 28, and an axis of symmetry for shaping determining unit 30. The storage unit 15 includes a figure storage unit 51 and a characteristic point storage unit 52. In FIG. 10, illustration is made only of a characteristic part of the structure of the present embodiment and that of the remaining common part is omitted.

In the above-described structure, the input unit 11, the storage unit 15 and the output unit 16 are similarly structured to their counterparts of the first embodiment shown in FIG. 1. In the structure of the data processing unit 12C, the components other than the axis of symmetry for shaping determining unit 30 are similarly structured to their counterparts in the data processing unit 12A of the first embodiment shown in FIG. 1 and are accordingly allotted the same reference numerals to omit their description. The data processing unit 12C is provided with a readable memory which stores a program for implementing the respective functions of the above-described components. The readable memory may be a storage medium such as a magnetic disk or a semiconductor memory.

When an input figure is symmetric with respect to both of a candidate horizontal axis of symmetry and a candidate vertical axis of symmetry, the axis of symmetry for shaping determining unit 30 selectively decides on one of the candidate axes of symmetry as a reference axis of symmetry for the execution of processing by the symmetrization processing unit 28. Possible axis of symmetry deciding methods include selection of a candidate axis of symmetry displayed on a display screen of the output unit 16 by a user and automatic selection according to a predetermined criterion (e.g. selecting one candidate axis of symmetry if a decision is made that an input figure is more highly symmetric when the axis is used.)

Figure 11A:
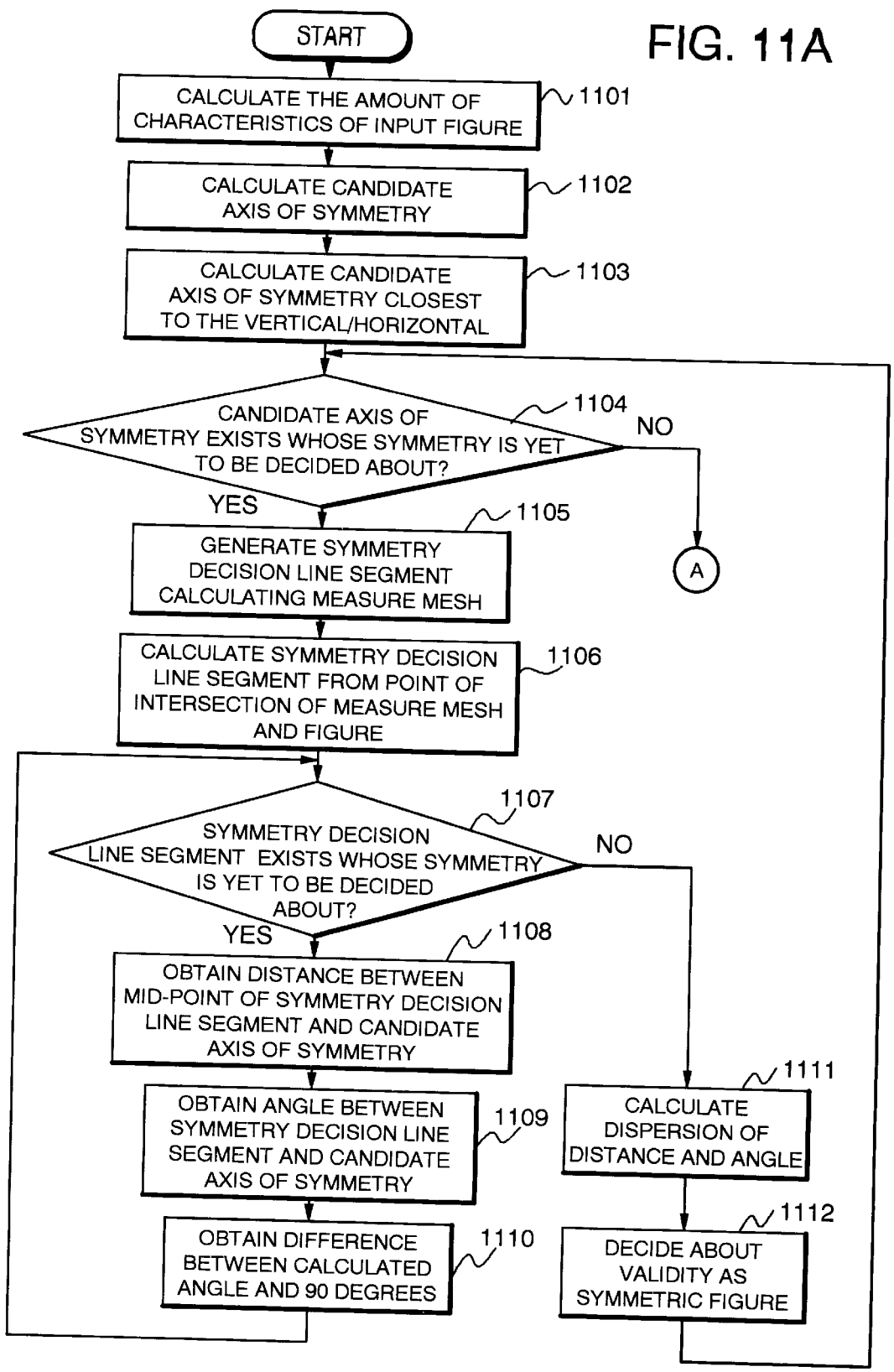
FIGS. 11A and 11B are flow charts showing operation of the third embodiment.
Figure 11B:
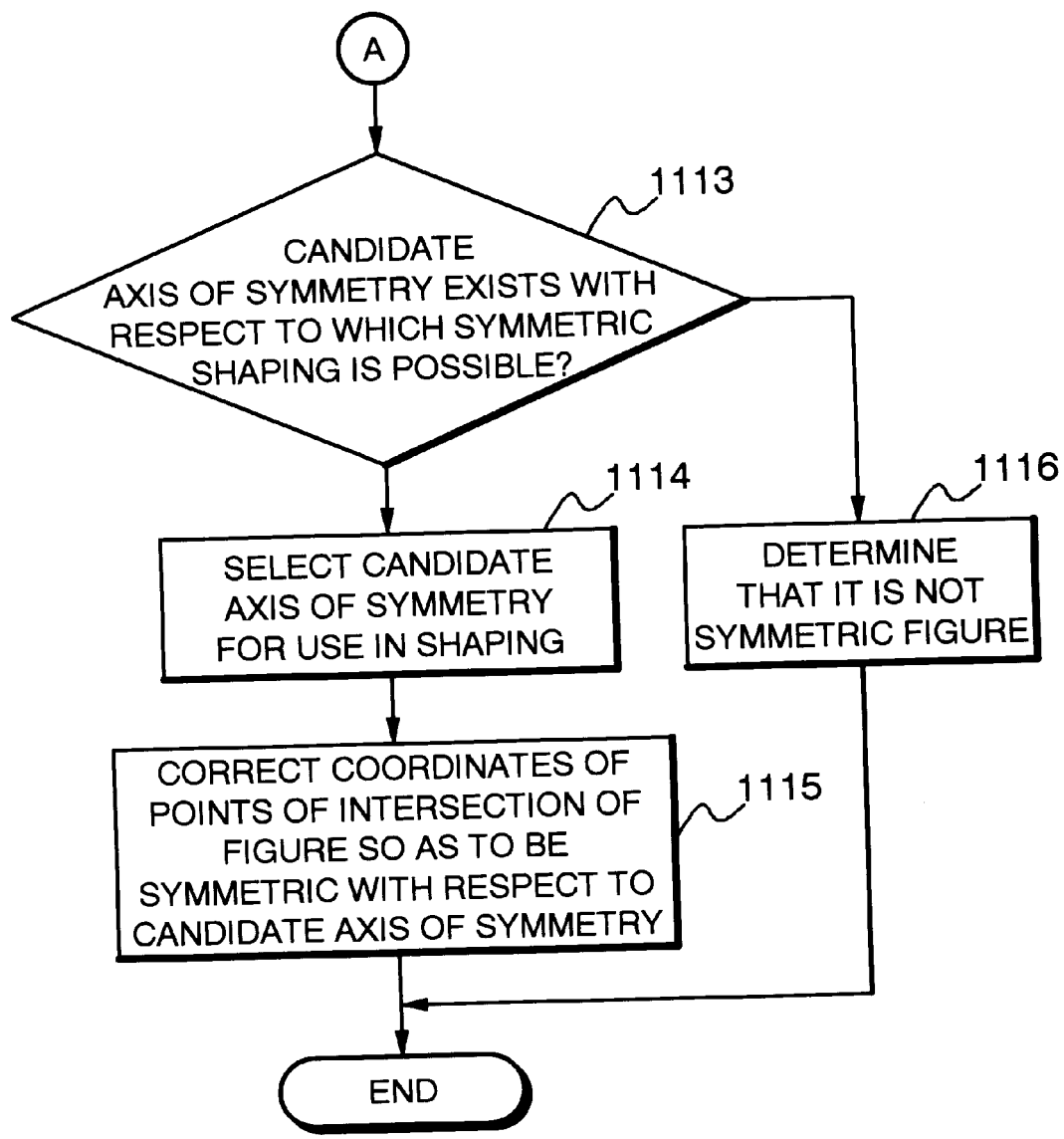

Next, operation of the present embodiment will be described with reference to the flow charts of FIGS. 11A and 11B.

Since operation at Steps 1101 to 1111 in FIG. 11 is the same as the operation at Steps 201 to 211, no description will be made thereof.

After calculating dispersion of the calculation results obtained by the distance of axis of symmetry calculating unit 25 and the angle of axis of symmetry calculating unit 26 (Step 1111), the symmetry decision unit 27 decides on validity of the figure as an axisymmetric figure (Step 1112) and stores the determination result in the storage unit 15. After a decision is made on axisymmetry of the input figure with respect to both of candidate horizontal and vertical axes of symmetry, when a candidate axis of symmetry appropriate as an axis of symmetry exists, that is, when there exists a candidate axis of symmetry in a case where determination is made that the input figure is symmetric, the axis of symmetry for shaping determining unit 30 determines a candidate axis of symmetry to be used as an axis of symmetry (Steps 1113 and 1114).

Then, the symmetrization processing unit 28 corrects coordinates of points of intersection of the curve and the lattice calculated at the symmetry decision line segment calculating unit 24 and coordinates of the characteristic points such that the input figure is precisely axisymmetric with respect to the determined axis of symmetry (Step 1115).

When there exists no appropriate candidate axis of symmetry as an axis of symmetry, determination is made that the input figure is not an axisymmetric figure (Step 1116).

The above-described axisymmetric figure shaping device according to the third embodiment, when both of candidate horizontal and vertical axes of symmetry are appropriate as an axis of symmetry for an input figure, is allowed to shape the figure by using one of the candidate axes of symmetry, whereby a shaping result better meeting with a user's intention can be obtained. In addition, by appropriately selecting a candidate axis of symmetry to be sued as an axis of symmetry, the device is allowed to shape an input figure so as to maintain a form approximate to its original form.

Figure 12:
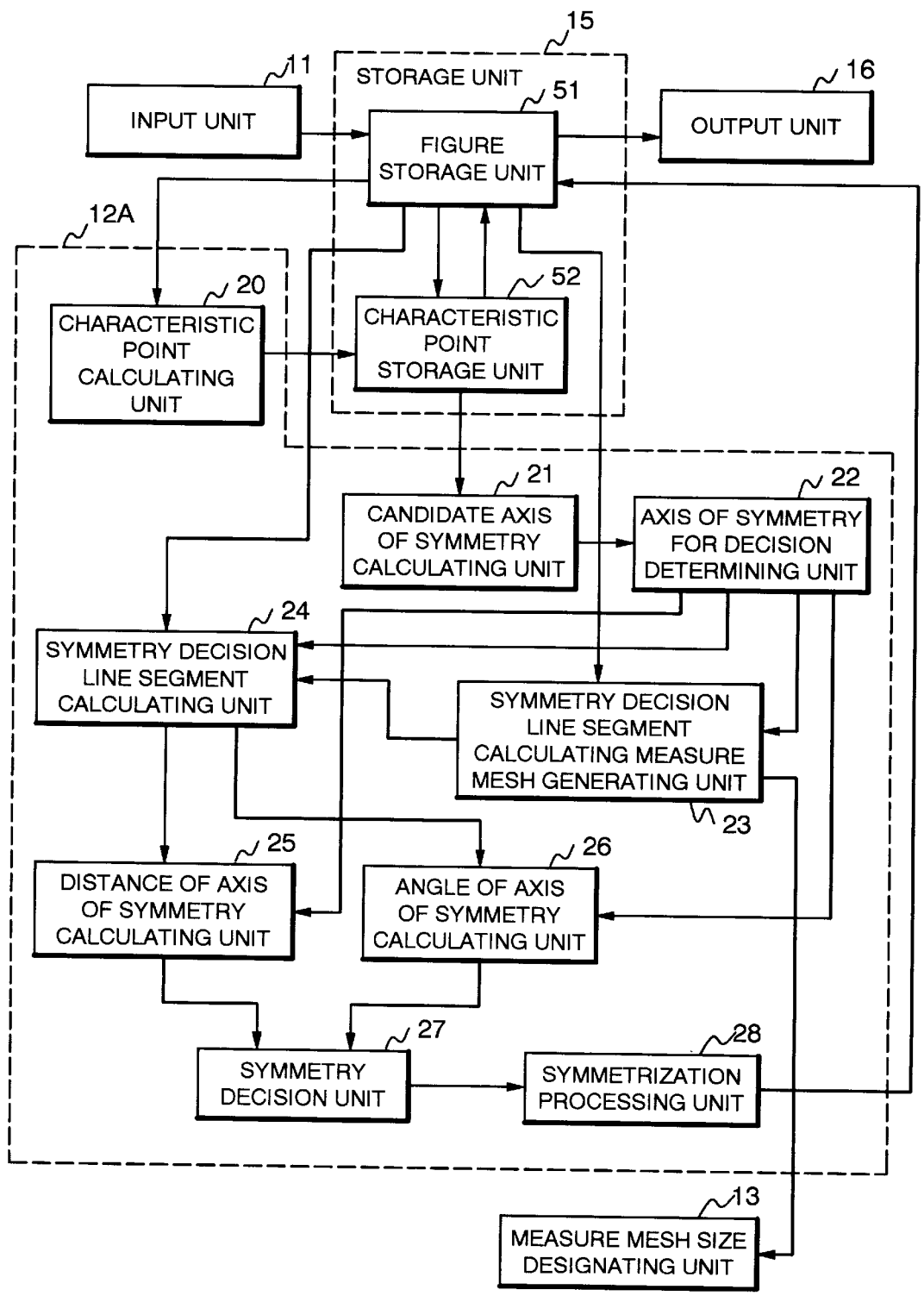
FIG. 12 is a block diagram showing structure of an axisymmetric figure shaping device according to a fourth embodiment of the present invention.

FIG. 12 is a block diagram showing structure of an axisymmetric figure shaping device according to a fourth embodiment of the present invention.

As illustrated in FIG. 12, the axisymmetric figure shaping device of the fourth embodiment includes an input unit 11 for receiving input of a figure, a data processing unit 12A for shaping a figure, a storage unit 15 for storing figure information and characteristic points, an output unit 16 for outputting an input figure and a figure having been shaped and a measure mesh size designating unit 13 for designating the size of a measure mesh for use in the shaping of a figure by the data processing unit 12A. The data processing unit 12A includes a characteristic point calculating unit 20, a candidate axis of symmetry calculating unit 21, an axis of symmetry for decision determining unit 22, a symmetry decision line segment calculating measure mesh generating unit 23, a symmetry decision line segment calculating unit 24, a distance of axis of symmetry calculating unit 25, an angle of axis of symmetry calculating unit 26, a symmetry decision unit 27, and a symmetrization processing unit 28. The storage unit 15 includes a figure storage unit 51 and a characteristic point storage unit 52. In FIG. 12, illustration is made only of a characteristic part of the structure of the present embodiment and that of the remaining common part is omitted.

In the above-described structure, the input unit 11, the data processing unit 12A, the storage unit 15 and the output unit 16 are similarly structured to their counterparts of the first embodiment shown in FIG. 1. The same numerals are therefore allotted to these components to omit their description.

The measure mesh size designating unit 13, when the symmetry decision line segment calculating measure mesh generating unit 23 of the data processing unit 12A generates a lattice which forms a measure mesh for calculating a symmetry decision line segment, designates the size of the measure mesh. Designation of the size of a measure mesh can be realized by the designation by user's input, the decision in proportion to the size of a figure, etc. The measure mesh size designating unit 13 is implemented by a program-controlled CPU or the like when the size of a measure mesh is to be designated according to predetermined rules employing the size of a figure etc. When the size of a measure mesh is to be designated by user's designation, the unit is implemented by an input device such as a keyboard, an interface, or the like.

Figure 13:
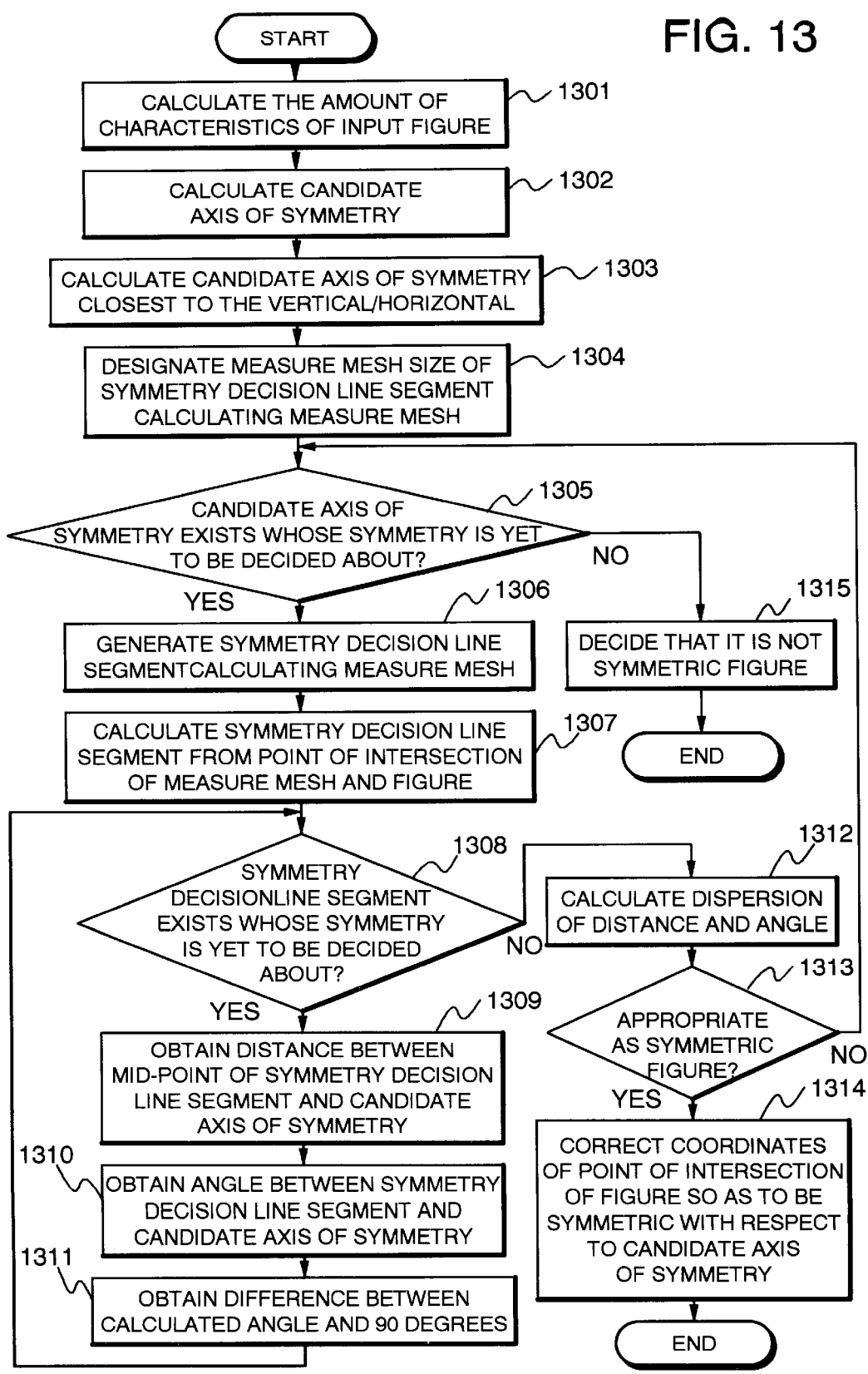
FIG. 13 is a flow chart showing operation of the fourth embodiment.

Operation of the present embodiment will be described with reference to the flow chart shown in FIG. 13.

Since in FIG. 13, operation at Steps 1301 to 1303 is the same as that at Steps 201 to 203 of the first embodiment shown in FIG. 2, no description will be made thereof.

After candidate horizontal and vertical axes of symmetry are calculated by the candidate axis of symmetry calculating unit 21, the measure mesh size designating unit 13 designates the size of a measure mesh formed of a lattice to the symmetry decision line segment calculating measure mesh generating unit 23 (Step 1304). The symmetry decision line segment calculating measure mesh generating unit 23 generates a lattice which forms a measure mesh for calculating a symmetry decision line segment according to the destination by the measure mesh size designating unit 13 (Step 1306).

The subsequent operation at Steps 1306 to 1314, and that at Steps 1305 and 1315 is the same as that at Steps 205 to 213, and that at Steps 204 and 214 of the first embodiment shown in FIG. 2 and therefore no description will be made thereof.

Setting of the measure mesh size designating unit 13 may be conducted at arbitrary timing before the execution of lattice generation processing by the symmetry decision line segment calculating measure mesh generating unit 23. More specifically, the unit may be preset as the initial setting or set by inquiring of a user at the time when the routine proceeds to the processing of the symmetry decision line segment calculating measure mesh generating unit 23.

The above-described axisymmetric figure shaping device according to the fourth embodiment is capable of changing the precision of symmetry decision and adjusting a processing speed by changing the size of a measure mesh for calculating a symmetry decision line segment.

Figure 14:
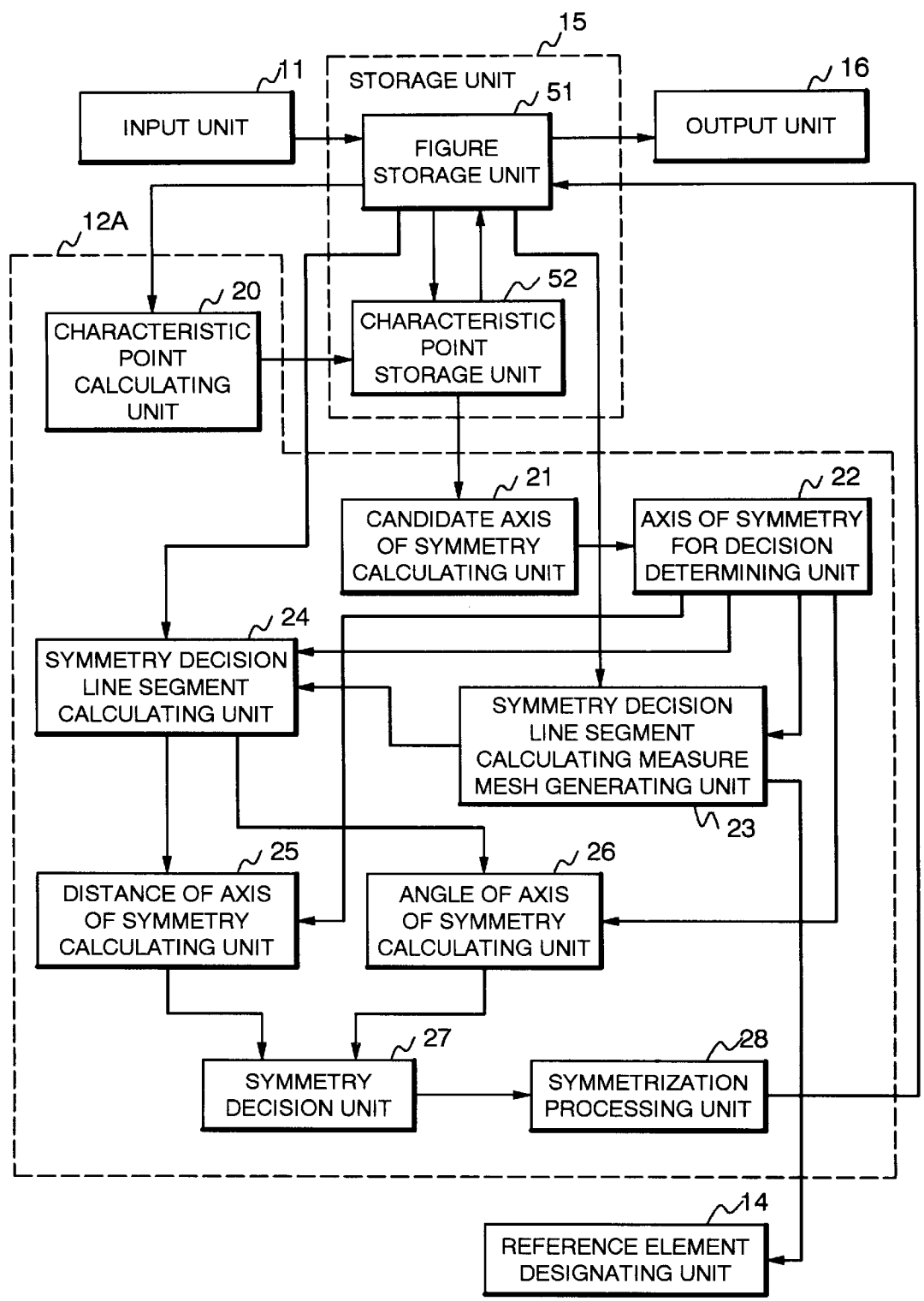
FIG. 14 is a block diagram showing structure of an axisymmetric figure shaping device according to a fifth embodiment of the present invention.

FIG. 14 is a block diagram showing structure of an axisymmetric figure shaping device according to a fifth embodiment of the present invention.

As illustrated in FIG. 14, the axisymmetric figure shaping device of the fifth embodiment includes an input unit 11 for receiving input of a figure, a data processing unit 12A for shaping a figure, a storage unit 15 for storing figure information and characteristic points, an output unit 16 for outputting an input figure and a figure having been shaped and a reference element designating unit 14 for designating a reference element for use in the shaping of a figure by the data processing unit 12A. The data processing unit 12A includes a characteristic point calculating unit 20, a candidate axis of symmetry calculating unit 21, an axis of symmetry for decision determining unit 22, a symmetry decision line segment calculating measure mesh generating unit 23, a symmetry decision line segment calculating unit 24, a distance of axis of symmetry calculating unit 25, an angle of axis of symmetry calculating unit 26, a symmetry decision unit 27, and a symmetrization processing unit 28. The storage unit 15 includes a figure storage unit 51 and a characteristic point storage unit 52. In FIG. 14, illustration is made only of a characteristic part of the structure of the present embodiment and that of the remaining common part is omitted.

In the above-described structure, the input unit 11, the data processing unit 12A, the storage unit 15 and the output unit 16 are similarly structured to their counterparts of the first embodiment shown in FIG. 1. The same numerals are therefore allotted to these components to omit their description.

The reference element designating unit 14, which is implemented by a program-controlled CPU, an input device such as a keyboard and an interface or the like, designates an element to be referred to by the symmetrization processing unit 28 for executing symmetrization processing of a figure. Elements to be referred to in the symmetrization processing include, for example, the following elements according to the contents of the processing.

1) Reference elements used when a position of an axis of symmetry is to be determined Vertical axis of symmetry: coordinates of a mid-point of a candidate axis of symmetry, or out of points of intersection of the candidate axis of symmetry and an input figure, coordinates of a point of intersection located on the upper side or coordinates of a point of intersection on the lower side.

Horizontal axis of symmetry: coordinates of a mid-point of a candidate axis of symmetry, or out of points of intersection of the candidate axis of symmetry and an input figure, coordinates of a point of intersection on the left side, or coordinates of a point of intersection on the right side.

2) Reference element used when coordinates of a point of intersection of a curve forming a figure and a lattice forming a measure mesh is to be corrected Vertical axis of symmetry: coordinates of a point of intersection on the left side of a candidate axis of symmetry, or coordinates of a point of intersection on the right side, or coordinates of a point of intersection of the candidate axis of symmetry and a symmetry decision line segment.

Horizontal axis of symmetry: coordinates of a point of intersection on the upper side of a candidate axis of symmetry, or coordinates of a point of intersection on the lower side, or coordinates of a point of intersection of the candidate axis of symmetry and a symmetry decision line segment.

More specifically, when a vertical axis of symmetry is to be positioned, with respect, for example, to coordinates of a point of intersection, on the upper side, of a candidate axis of symmetry and an input figure, so as to pass the coordinate point. When coordinates of a point of intersection of a curve and a lattice are to be corrected, with respect, for example, to coordinates of a point of intersection on the left side of a candidate vertical axis of symmetry, a point of intersection on the right side is shifted to a position precisely symmetric to the candidate vertical axis of symmetry.

The foregoing reference elements and reference methods are by way of example only and are not to be taken by way of limitation of introduction of other reference elements and reference methods.

Figure 15:
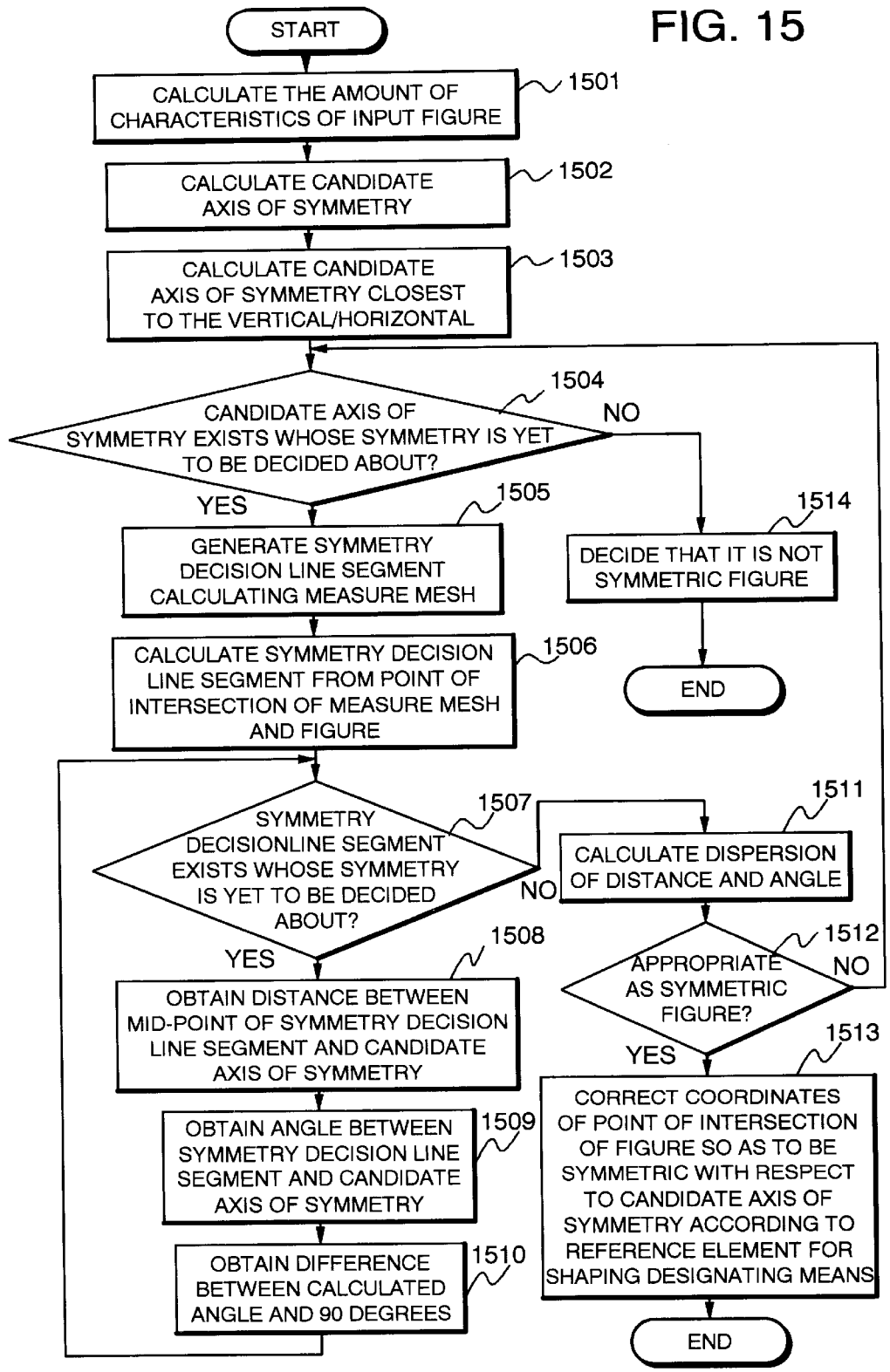
FIG. 15 is a flow chart showing operation of the fifth embodiment.

Next, operation of the present embodiment will be described with reference to the flow chart shown in FIG. 15.

Since in FIG. 15, operation at Steps 1501 to 1512 is the same as the operation at Steps 201 to 212 according to the first embodiment shown in FIG. 2, no description will be made thereof.

When the decision is made at the symmetry decision unit 27 that an input figure has axisymmetry, the symmetrization processing unit 28 corrects, such that a pair of points of intersection of a curve and a lattice calculated by the symmetry decision line segment calculating unit 24 and characteristic points are each located at a position precisely symmetric with respect to a candidate vertical axis of symmetry, coordinates of the points of intersection and the characteristic points according to the instructions from the reference element designating unit 14 (Steps 1512 and 1513). Then, the unit 28 stores a shaped figure formed by the corrected points of intersection and characteristic points in the figure storage unit 51. The shaped figure stored in the figure storage unit 51 is output to the output unit 16.

On the other hand, when the decision is made that the input figure has axisymmetry with respect to neither of the candidate axes of symmetry, determination is made that the input figure is not axisymmetric (Steps 1512, 1504 and 1514).

Setting of the reference element designating unit 14 may be conducted at arbitrary timing before the execution of the symmetrization processing by the symmetrization processing unit 28. More specifically, the unit may be preset as the initial setting or set by inquiring of a user at the time when the routine proceeds to the processing of the symmetrization processing unit 28.

Since the above-described axisymmetric figure shaping device according to the fifth embodiment is allowed to determine a position of an axis of symmetry and designate an element to be referred to for determining a correction position of a coordinate point at the time of symmetrization processing, axisymmetric figure shaping better meeting with user's intention is possible.

Figure 16:
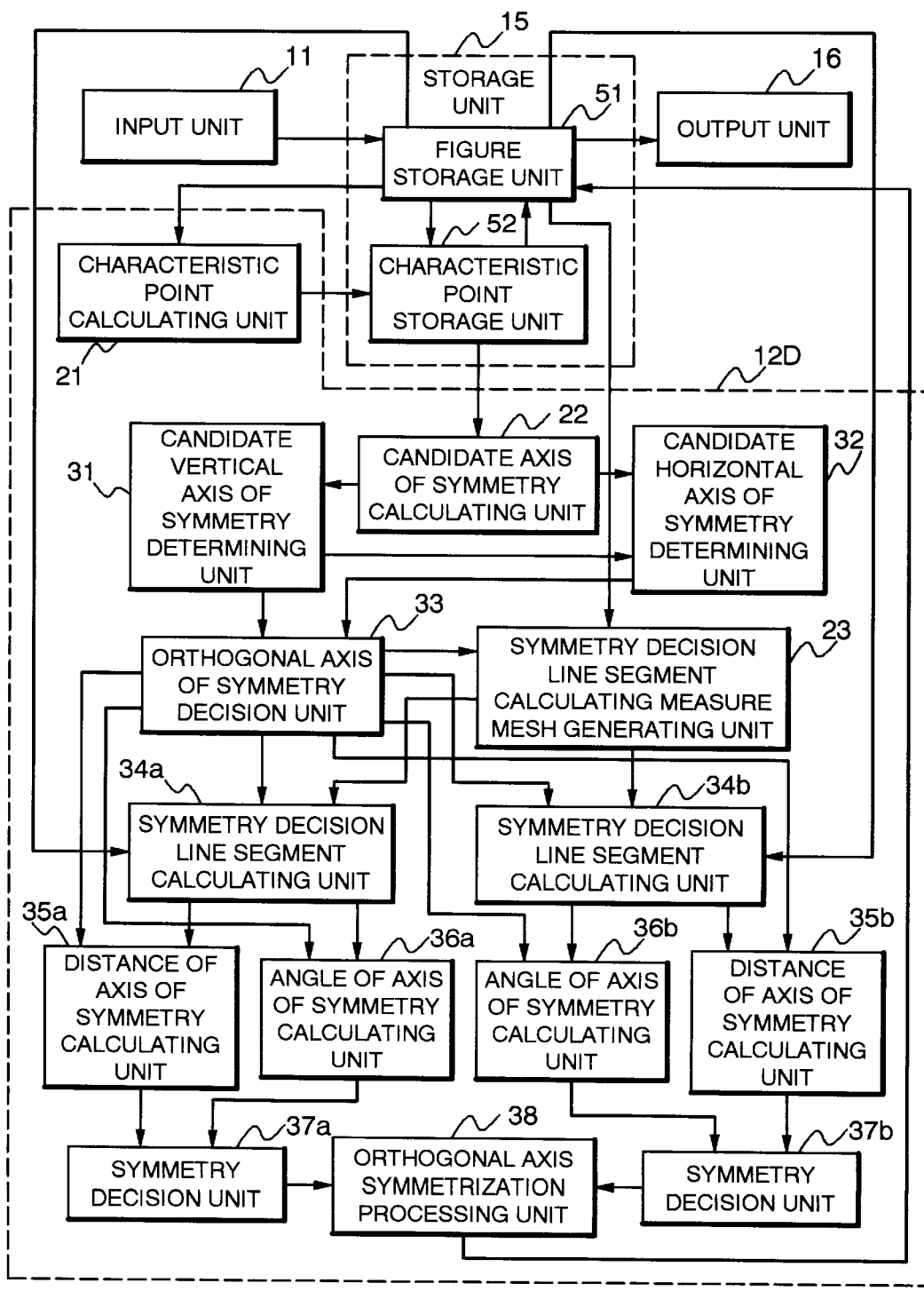
FIG. 16 is a block diagram showing structure of an axisymmetric figure shaping device according to a sixth embodiment of the present invention.

FIG. 16 is a block diagram showing structure of an axisymmetric figure shaping device according to a sixth embodiment of the present invention.

As illustrated in FIG. 16, the axisymmetric figure shaping device of the sixth embodiment includes an input unit 11 for receiving input of a figure, a data processing unit 12D for shaping a figure, a storage unit 15 for storing figure information and characteristic points, and an output unit 16 for outputting an input figure and a figure having been shaped. In FIG. 16, illustration is made only of a characteristic part of the structure of the present embodiment and that of the remaining common part is omitted. The data processing unit 12D is provided with a readable memory which stores a program for implementing the respective functions of the above-described components. The readable memory may be a storage medium such as a magnetic disk or a semiconductor memory.

The data processing unit 12D, as illustrated in the figure, includes a characteristic point calculating unit 20, a candidate axis of symmetry calculating unit 21, a candidate vertical axis of symmetry determining unit 31, a candidate horizontal axis of symmetry determining unit 32, an orthogonal axis of symmetry decision unit 33, a symmetry decision line segment calculating measure mesh generating unit 23, symmetry decision line segment calculating units 34A and 34B, distance of axis of symmetry calculating units 35A and 35B, angle of axis of symmetry calculating units 36A and 36B, symmetry decision units 37A and 37B, and an orthogonal axis symmetrization processing unit 38. The storage unit 15 includes a figure storage unit 51 and a characteristic point storage unit 52. In the above-described structure, the input unit 11, the storage unit 15 and the output unit 16 are similarly structured to their counterparts of the first embodiment shown in FIG. 1. In addition, the characteristic point calculating unit 20, the candidate axis of symmetry calculating unit 21 and the symmetry decision line segment calculating measure mesh generating unit 23 of the data processing unit 12D are similarly structured to their counterparts in the data processing unit 12A of the first embodiment shown in FIG. 1 and therefore the same numerals are allotted to these components to omit their description.

The candidate vertical axis of symmetry determining unit 31 extracts one candidate axis of symmetry closest to the vertical (candidate vertical axis of symmetry) among all the candidate axes of symmetry calculated at the candidate axis of symmetry calculating unit 21. The candidate horizontal axis of symmetry determining unit 32 extracts one candidate axis of symmetry to be taken as a horizontal candidate axis of symmetry (candidate horizontal axis of symmetry) from among all the candidate axes of symmetry calculated at the candidate axis of symmetry calculating unit 21 by using the candidate vertical axis of symmetry extracted at the candidate horizontal axis of symmetry determining unit 31 following the procedure set forth below.

First, the unit 32 selects one of the characteristic points at which the candidate vertical axis of symmetry extracted by the candidate vertical axis of symmetry determining unit 31 passes and counts characteristic points on the curve forming the figure toward the other characteristic point. When the number of characteristic points on one curve from one characteristic point to the other is n, the unit 32 takes a straight line linking the (n/2)th points counted from the one characteristic point as a candidate horizontal axis of symmetry. When the number n of the counted characteristic points is an odd number, number below the decimal point of n/2 is discarded. In this case, the decision is made that the input figure is not symmetric with respect to the candidate horizontal axis and the candidate vertical axis of symmetry. In a case where the characteristic points on the opposite sides of the candidate vertical axis of symmetry differ in number, the processing is completed because the figure in question has no axisymmetry.

The orthogonal axis of symmetry decision unit 33 decides whether two candidate axes of symmetry extracted by the candidate vertical axis of symmetry determining unit 31 and the candidate horizontal axis of symmetry determining unit 32 intersect with each other approximately at right angles. That two candidate axes of symmetry intersect with each approximately at right angles (or are perpendicular to each other) indicates that the two candidate axes of symmetry intersect with each other at right angles (90 degrees) or at an angle approximate to a right angle. The angle approximate to a right angle can be arbitrarily determined by setting a threshold value in advance. More specifically, candidate axes of symmetry are considered to intersect with each other approximately at right angles when a difference in angle between the angle of the intersection of the candidate axes of symmetry and 90 degrees is within the threshold value. With the threshold value set to be 5 degrees, for example, if two candidate axes of symmetry intersect with each other at an angle from 85 degrees to 95 degrees, the two candidate axes of symmetry are approximately perpendicular to each other.

In addition, when a difference in angle between the angle of intersection of two candidate axes of symmetry and 90 degrees is within a threshold value, that is, when a decision is made that the two candidate axes of symmetry are approximately perpendicular to each other, the orthogonal axis of symmetry decision unit 33 shapes the two candidate axes of symmetry into horizontal and vertical axes, respectively. As a result, the two candidate axes of symmetry will be precisely perpendicular to each other.

Furthermore, when a difference in angle between the angle of intersection of two candidate axes of symmetry and 90 degrees exceeds a threshold value, that is, when a decision is not made that the two candidate axes of symmetry intersect with each other approximately at right angles, the orthogonal axis of symmetry decision unit 33 decides that the input figure in question is not a symmetric figure having two perpendicular axes of symmetry to complete the processing.

The symmetry decision line segment calculating measure mesh generating unit 23, when the orthogonal axis of symmetry decision unit 33 decides that two candidate axes of symmetry intersect with each other at right angles, generates a lattice forming a rectangular measure mesh which will cover the input figure, with a point of intersection of two candidate axes of symmetry extracted by the candidate vertical axis of symmetry determining unit 31 and the candidate horizontal axis of symmetry determining unit 32 as the origin.

The symmetry decision line segment calculating unit 34A traces points of intersection of a curve and a lattice forming a measure mesh from one of two characteristic points at which a candidate vertical axis of symmetry calculated by the candidate vertical axis of symmetry determining unit 31 passes toward the other characteristic point to calculate a pair of the points of intersection to be a reference for deciding about symmetry of an input figure. Then, the unit 34A links the pair of intersection by a straight line to generate a symmetry decision line segment for use in the decision of symmetry.

The symmetry decision line segment calculating unit 34B executes the same processing with respect to a candidate horizontal axis of symmetry calculated by the candidate horizontal axis of symmetry determining unit 32 to generate a symmetry decision line segment.

The distance of axis of symmetry calculating unit 35A calculates a distance between a mid-point of a symmetry decision line segment generated based on a candidate vertical axis of symmetry by the symmetry decision line segment calculating unit 34A and the candidate vertical axis of symmetry. The angle of axis of symmetry calculating unit 36A calculates an angle between the symmetry decision line segment and the candidate vertical axis of symmetry and calculates a difference between the angle and 90 degrees.

The distance of axis of symmetry calculating unit 35B and the angle of axis of symmetry calculating unit 36B execute the same processing with respect to a symmetry decision line segment generated by the symmetry decision line segment calculating unit 34B based on a candidate horizontal axis of symmetry to calculate parameters regarding a distance and an angle between the symmetry decision line segment and the candidate horizontal axis of symmetry.

The symmetry decision unit 37A calculates dispersion of all the values of distances between mid-points of symmetry decision line segments and a candidate vertical axis of symmetry calculated by the distance of axis of symmetry calculating unit 35A and calculates dispersion of all the differences in angle between angles between the symmetry decision line segments and the candidate vertical axis of symmetry and 90 degrees calculated by the angle of axis of symmetry calculating unit 36A to decide about axisymmetry of an input figure based on the calculation results.

The symmetry decision unit 37B calculates dispersion of all the values of distances between mid-points of symmetry decision line segments and a candidate horizontal axis of symmetry calculated by the distance of axis of symmetry calculating unit 35B and calculates dispersion of all the differences in angle between angles between the symmetry decision line segments and the candidate horizontal axis of symmetry and 90 degrees calculated by the angle of axis of symmetry calculating unit 36B to decide about axisymmetry of an input figure based on the calculation results.

The orthogonal axis symmetrization processing unit 38 transforms an input figure which is decided to be symmetric with respect to both of a candidate vertical axis of symmetry and a candidate horizontal axis of symmetry by the symmetrization decision units 37A and 37B into a figure axisymmetric with respect to both of the two candidate axes of symmetry. More specifically, the unit 38 appropriately modifies coordinates of a pair of points of intersection of a curve and lattice calculated by the symmetry decision line segment calculating units 34A and 34B and coordinates of characteristic points calculated by the characteristic point calculating unit 20. The figure generated as a result of the transformation of the input figure is stored in the figure storage unit 51.

Figure 17:
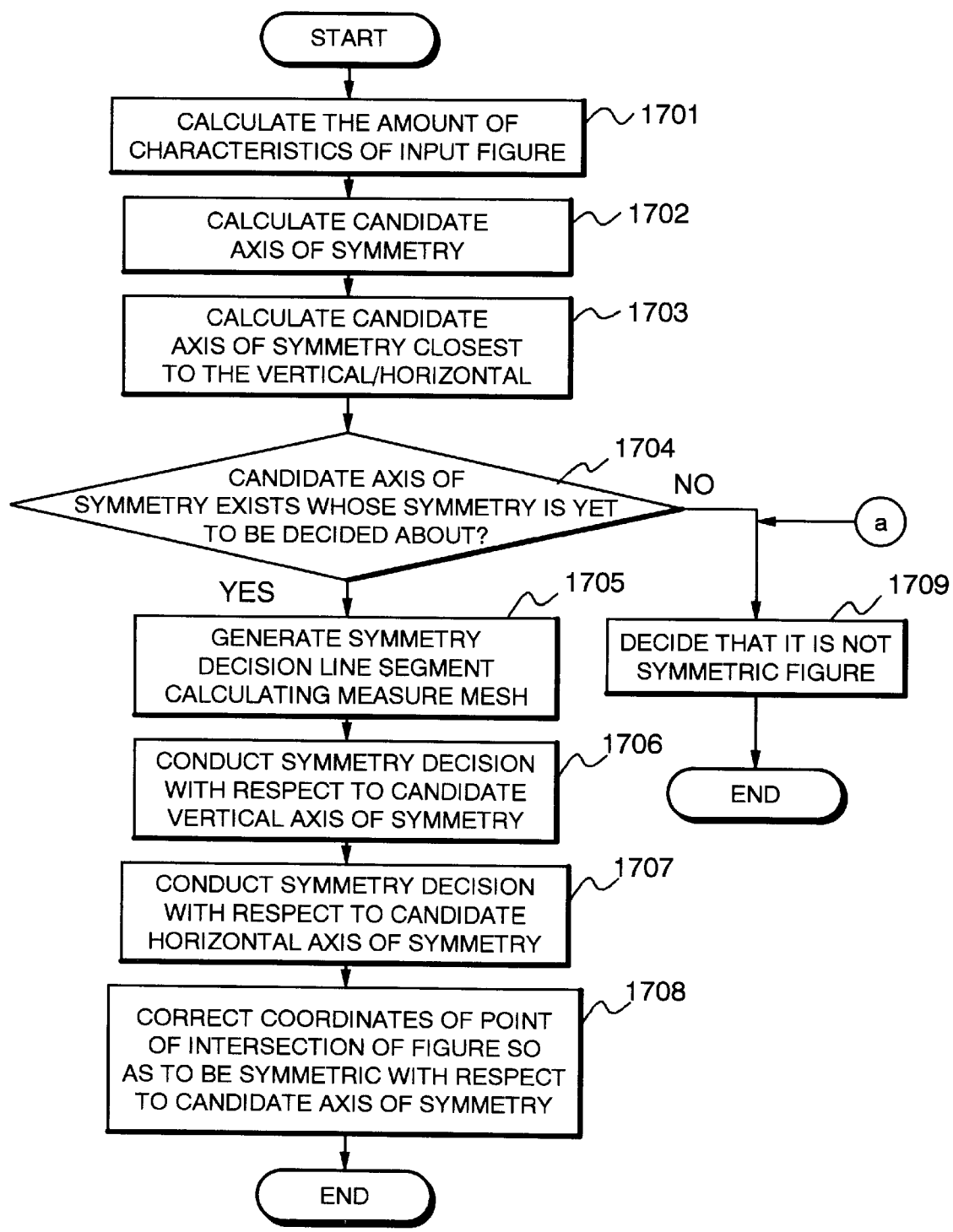
FIG. 17 is a flow chart showing operation of the sixth embodiment.
Figure 18:
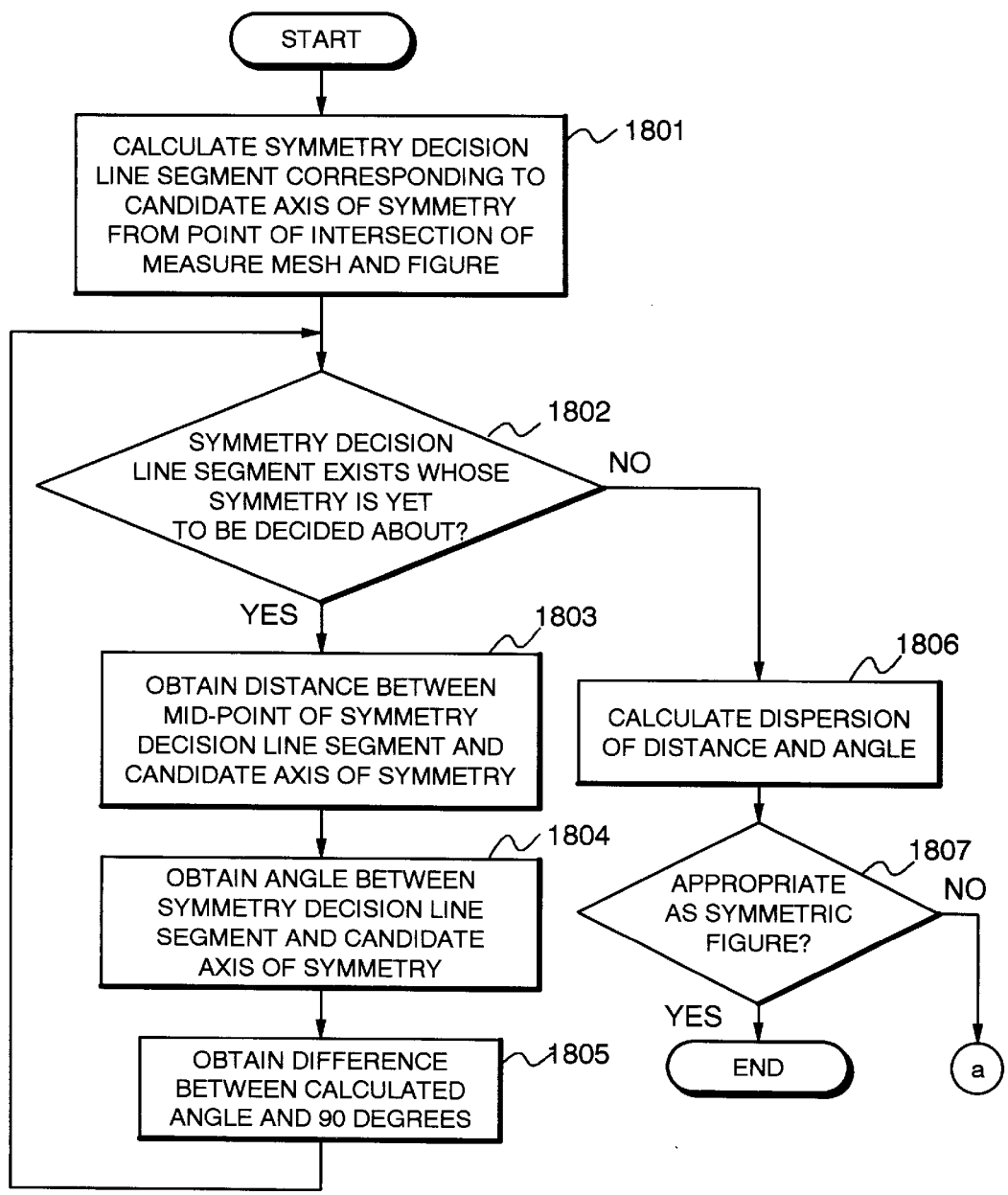
FIG. 18 is a flow chart showing operation of symmetry decision processing out of the operation of the sixth embodiment.
Figure 21:
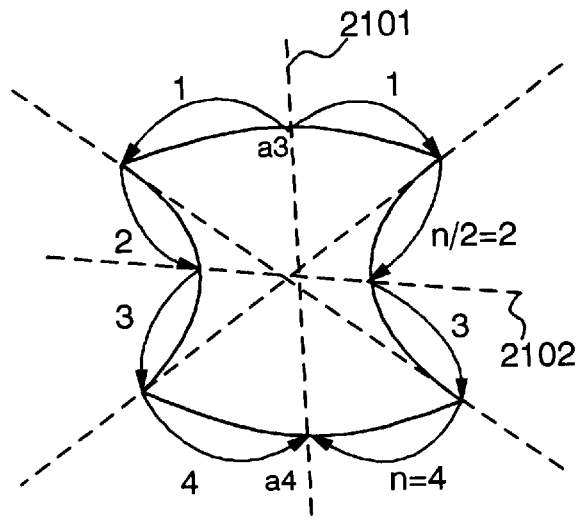
FIG. 21 is a diagram showing a method of calculating a candidate vertical axis of symmetry and a candidate horizontal axis of symmetry among the candidate axes of symmetry illustrated in FIG. 20.
Figure 22:
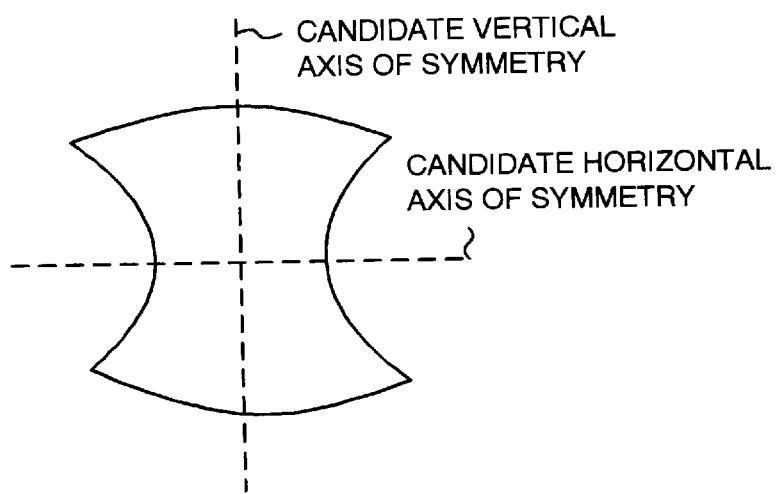
FIG. 22 is a diagram showing a candidate vertical axis of symmetry and a candidate horizontal axis of symmetry extracted from the input figure of FIG. 19.

Next, with reference to FIGS. 16 to 22, operation of the present embodiment will be described. FIGS. 17 and 18 are flow charts showing a flow of processing of the present embodiment. FIG. 19 shows an input figure (A) to be processed according to the present embodiment and a figure (B) which is obtained by shaping the input figure. FIG. 20 is a diagram showing candidate axes of symmetry calculated by the candidate axis of symmetry calculating unit 21. FIG. 21 is a diagram showing an example of a method of determining a candidate horizontal axis of symmetry based on a candidate vertical axis of symmetry. FIG. 22 is a diagram showing, out of the candidate axes of symmetry shown in FIG. 20, a candidate vertical axis of symmetry extracted by the candidate vertical axis of symmetry determining unit 31 and a candidate horizontal axis of symmetry extracted by the candidate horizontal axis of symmetry determining unit 32 based on the candidate vertical axis of symmetry.

A figure input through the input unit 11 is stored in the figure storage unit 51 as an input coordinate point sequence which traces a locus of a curve. The characteristic point calculating unit 20 calculates coordinates of a vertex and maximal and minimal points in the horizontal and the vertical from the input coordinate point sequence and stores them in the characteristic point storage unit 52 as characteristic points of the input figure (FIG. 17, Step 1701). With such an input figure as shown in FIG. 19(A), eight characteristic points will be calculated as illustrated in FIG. 20. The input figure is also output to the output unit 16.

Next, the candidate axis of symmetry calculating unit 21 refers to the characteristic points stored in the characteristic point storage unit 52 to pair a m-th characteristic point with a (n/2+m)th characteristic point (m=1, 2, . . . ) of an input figure whose characteristic points number n and takes each line as a candidate axis of symmetry (Step 1702). For the input figure illustrated in FIG. 19(A), four candidate axes of symmetry, J5 to J8, will be calculated as shown in FIG. 20.

The candidate vertical axis of symmetry determining unit 31 extracts a candidate axis of symmetry closest to the vertical among all the candidate axes of symmetry calculated by the candidate axis of symmetry calculating unit 21. The candidate horizontal axis of symmetry determining unit 32 extracts a candidate horizontal axis of symmetry based on the candidate vertical axis of symmetry extracted by the candidate vertical axis of symmetry determining unit 31 (Step 1703).

In a case of the input figure illustrated in FIG. 19(A), as shown in FIG. 21, with a straight line passing at characteristic points (a3) and (a4) as a candidate vertical axis of symmetry 2101, the candidate horizontal axis of symmetry determining unit 32 counts characteristic points on the opposites sides of the candidate vertical axis of symmetry 2101 from one characteristic point (a3) toward the other characteristic point (a4) at which the candidate vertical axis of symmetry 2101 passes. Since the number n of the characteristic points is 4, the unit 32 then takes a straight line linking the second (=n/2) characteristic points as a candidate horizontal axis of symmetry 2102.

Next, the orthogonal axis of symmetry decision unit 33 calculates an angle of the intersection of the two candidate axes of symmetry 2101 and 2102 to decide whether the axes intersect with each other at approximately right angles. When a decision is not made that the two candidate axes of symmetry 2101 and 2102 are approximately perpendicular to each other, determination is made that the input figure is not a figure symmetric with respect to the two axes of symmetry perpendicular to each other to complete the processing (Steps 1704 and 1709).

On the other hand, when a decision is made that the two candidate axes of symmetry 2101 and 2102 are approximately perpendicular to each other, the orthogonal axis of symmetry decision unit 33 shapes the candidate axes of symmetry 2101 and 2102 to be precisely vertical and horizontal as illustrated in FIG. 22. The symmetry decision line segment calculating measure mesh generating unit 23 then generates a rectangular measure mesh which will cover the input figure, with the intersection of the two candidate vertical and horizontal axes of symmetry as the origin (Step 1705).

Next, decision is made about the symmetry of the input figure with respect to the candidate vertical axis of symmetry (Step 1706). FIG. 18 shows operation of symmetry decision processing. Since operation at Steps 1801 to 1806 of FIG. 18 is the same as that at Steps 206 to 213 in the operation of the symmetry decision processing according to the first embodiment shown in FIG. 2, no description will be made thereof.

Next, decision is made about symmetry of the input figure with respect to the candidate horizontal axis of symmetry following the same procedure (Step 1707).

When determination is made that the input figure is symmetric by the symmetry decision units 37A and 37B, that is, when determination is made that both of the extracted candidate vertical and horizontal axes of symmetry are appropriate as axes of symmetry for the input figure, the orthogonal axis symmetrization processing unit 38 corrects, such that pairs of the points of intersection of the curve and the lattice calculated by the symmetry decision line segment calculating units 34A and 34B and the characteristic points are each located at a position precisely symmetric with respect to the candidate horizontal and vertical axes of symmetry, coordinates of the points of intersection and the characteristic points (Step 1708).

Then, the unit 38 stores a shaped figure formed by the corrected points of intersection and characteristic points in the figure storage unit 51. The shaped figure stored in the figure storage unit 51, which is expressed as an approximate curve (e.g. spline curve) having the corrected points of intersection and characteristic points as characteristic points, is output to the output unit 16. In the illustrated example, the shaped figure shown in FIG. 19(B) is output in place of the input figure shown in FIG. 19(A).

The above-described axisymmetric figure shaping device according to the sixth embodiment enables two perpendicular axes of symmetry to be automatically extracted from a curvilinear figure input by a user to shape the input figure into a figure precisely axisymmetric to both of the two extracted perpendicular axes of symmetry.

Figure 23:
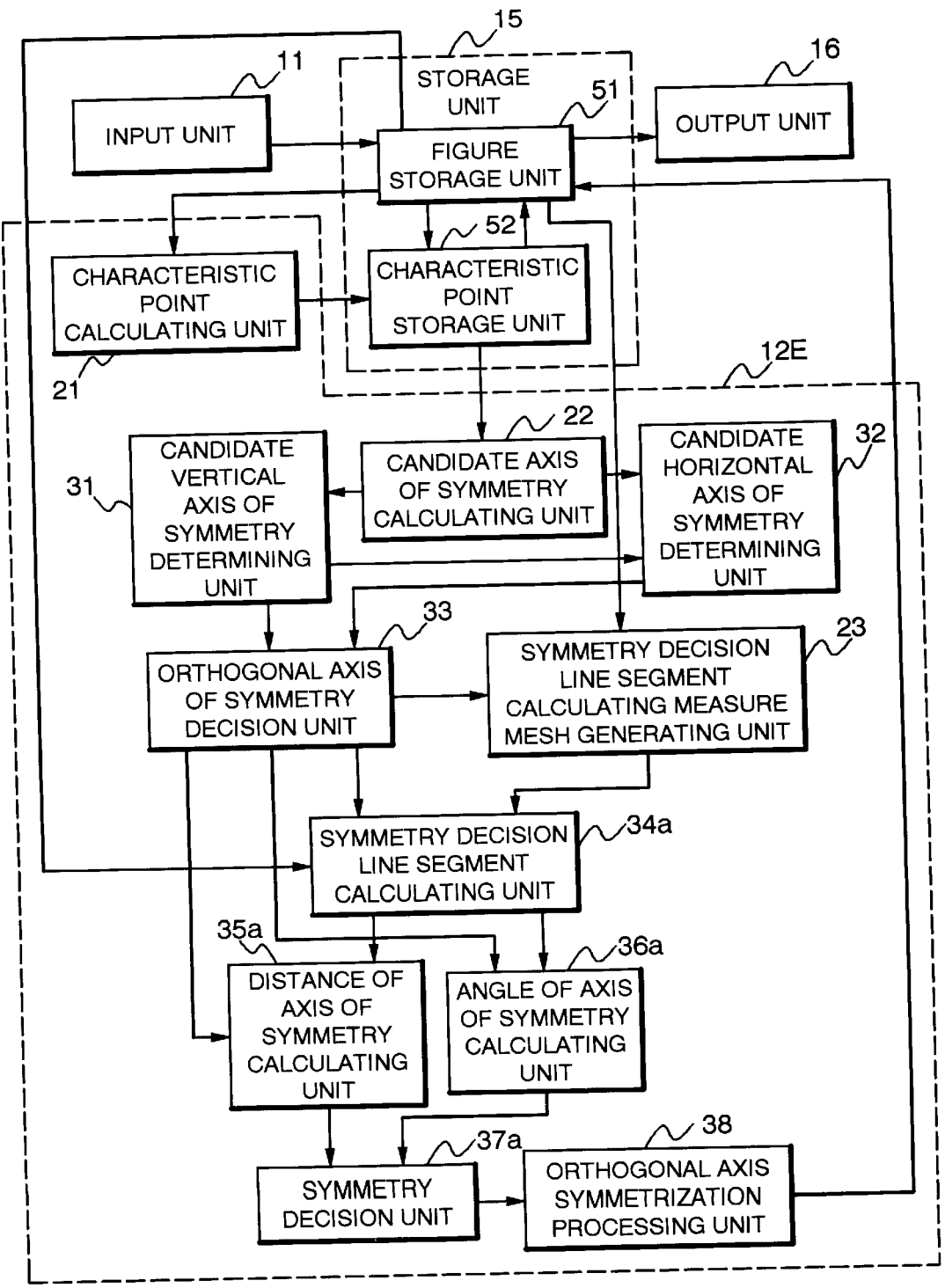
FIG. 23 is a block diagram showing structure of an axisymmetric figure shaping device as a variation of the sixth embodiment.

In the foregoing sixth embodiment, while the symmetry decision line segment calculating unit 34A, the distance of axis of symmetry calculating unit 35A, the angle of axis of symmetry calculating unit 36A and the symmetry decision unit 37A for conducting symmetry decision processing based on a candidate vertical axis of symmetry, and the symmetry decision line segment calculating unit 34B, the distance of axis of symmetry calculating unit 35B, the angle of axis of symmetry calculating unit 36B and the symmetry decision unit 37B for conducting symmetry decision processing based on a candidate horizontal axis of symmetry, are provided as individual components, the processing may be executed by the respective common components like in the data processing device 12E shown in FIG. 23 because the contents of the processing to be executed is the same.

Figure 24:
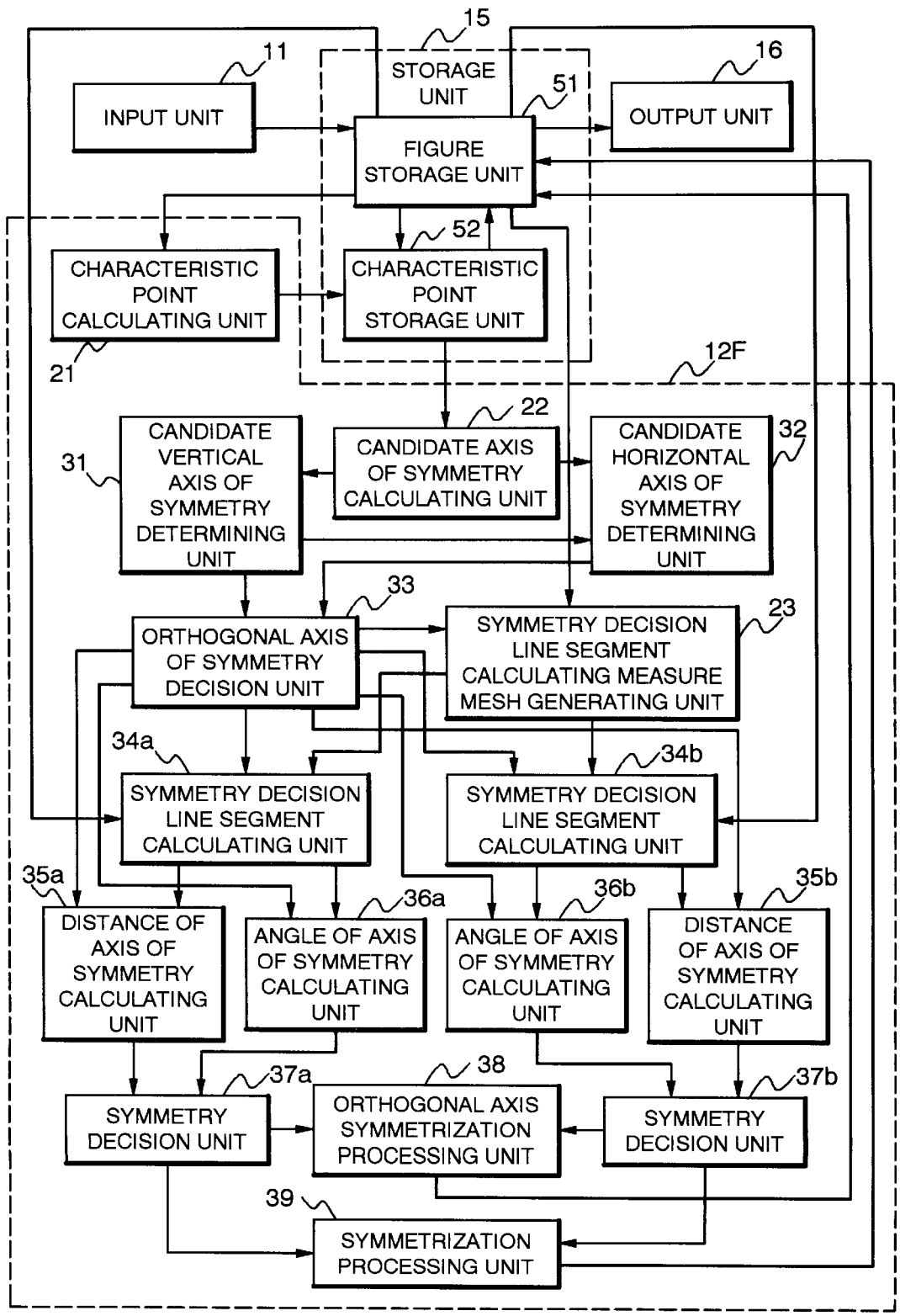
FIG. 24 is a block diagram showing structure of an axisymmetric figure shaping device according to a seventh embodiment of the present invention.

FIG. 24 is a block diagram showing structure of an axisymmetric figure shaping device according to a seventh embodiment of the present invention.

As illustrated in FIG. 24, the axisymmetric figure shaping device of the seventh embodiment includes an input unit 11 for receiving input of a figure, a data processing unit 12F for shaping a figure, a storage unit 15 for storing figure information and characteristic points, and an output unit 16 for outputting an input figure and a figure having been shaped. The data processing unit 12F includes a characteristic point calculating unit 20, a candidate axis of symmetry calculating unit 21, a candidate vertical axis of symmetry determining unit 31, a candidate horizontal axis of symmetry determining unit 32, an orthogonal axis of symmetry decision unit 33, a symmetry decision line segment calculating measure mesh generating unit 23, symmetry decision line segment calculating units 34A and 34B, distance of axis of symmetry calculating units 35A and 35B, angle of axis of symmetry calculating units 36A and 36B, symmetry decision units 37A and 37B, an orthogonal axis symmetrization processing unit 38, and a symmetrization processing unit 39. The storage unit 15 includes a figure storage unit 51 and a characteristic point storage unit 52. In FIG. 24, illustration is made only of a characteristic part of the structure of the present embodiment and that of the remaining common part is omitted. The data processing unit 12F is provided with a readable memory which stores a program for implementing the respective functions of the above-described components. The readable memory may be a storage medium such as a magnetic disk or a semiconductor memory.

In the above-described structure, the input unit 11, the storage unit 15 and the output unit 16 are similarly structured to their counterparts of the first embodiment shown in FIG. 1. In addition, in the structure of the data processing unit 12F, the components other than the symmetrization processing unit 39 are similarly structured to their counterpart components in the data processing unit 12D of the sixth embodiment shown in FIG. 16. The same reference numerals are therefore allotted to these components to omit their description.

The symmetrization processing unit 39, when determination is made as the result of a decision by the symmetrization decision units 37A and 37B that an input figure is symmetric with respect to one axis of symmetry but not to the other axis of symmetry to make symmetrization processing by the orthogonal axis symmetrization processing unit 38 impossible, conducts symmetrization processing with respect to the axis of symmetry to which the decision is made that the input figure is symmetric. The contents of the symmetrization processing are the same as those of the symmetrization processing described in the first and the sixth embodiments.

Figure 25:
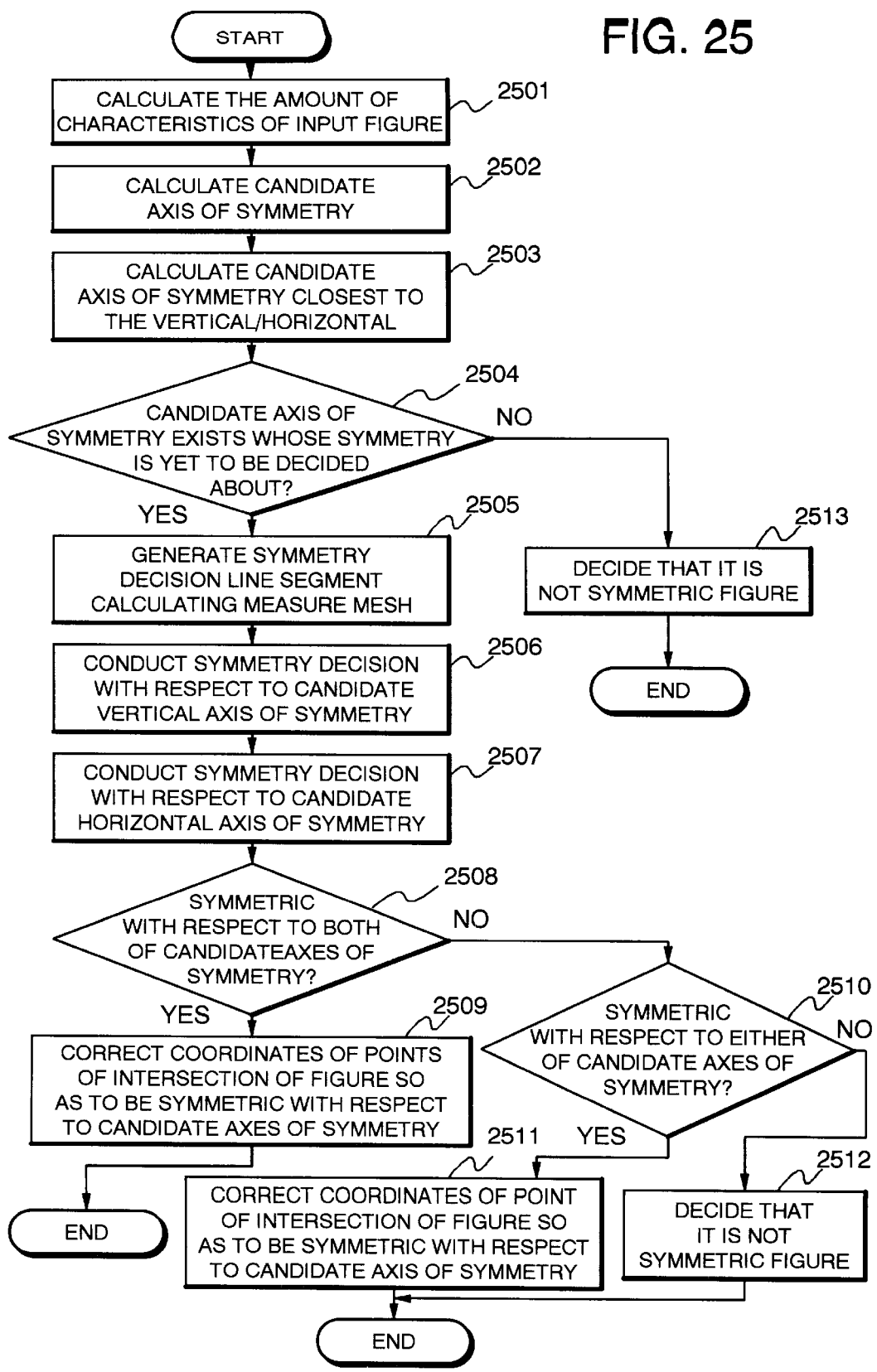
FIG. 25 is a flow chart showing operation of the seventh embodiment.
Figure 26:
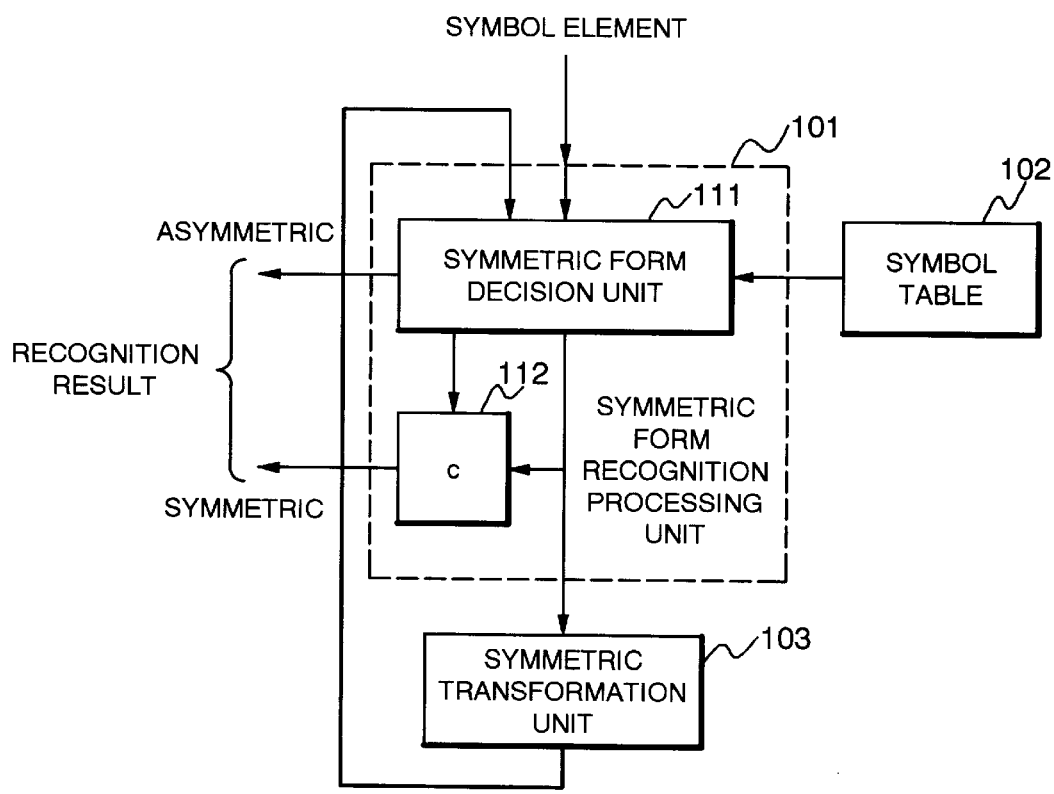
FIG. 26 is a block diagram showing structure of a conventional axisymmetric figure shaping device.
Figure 27:
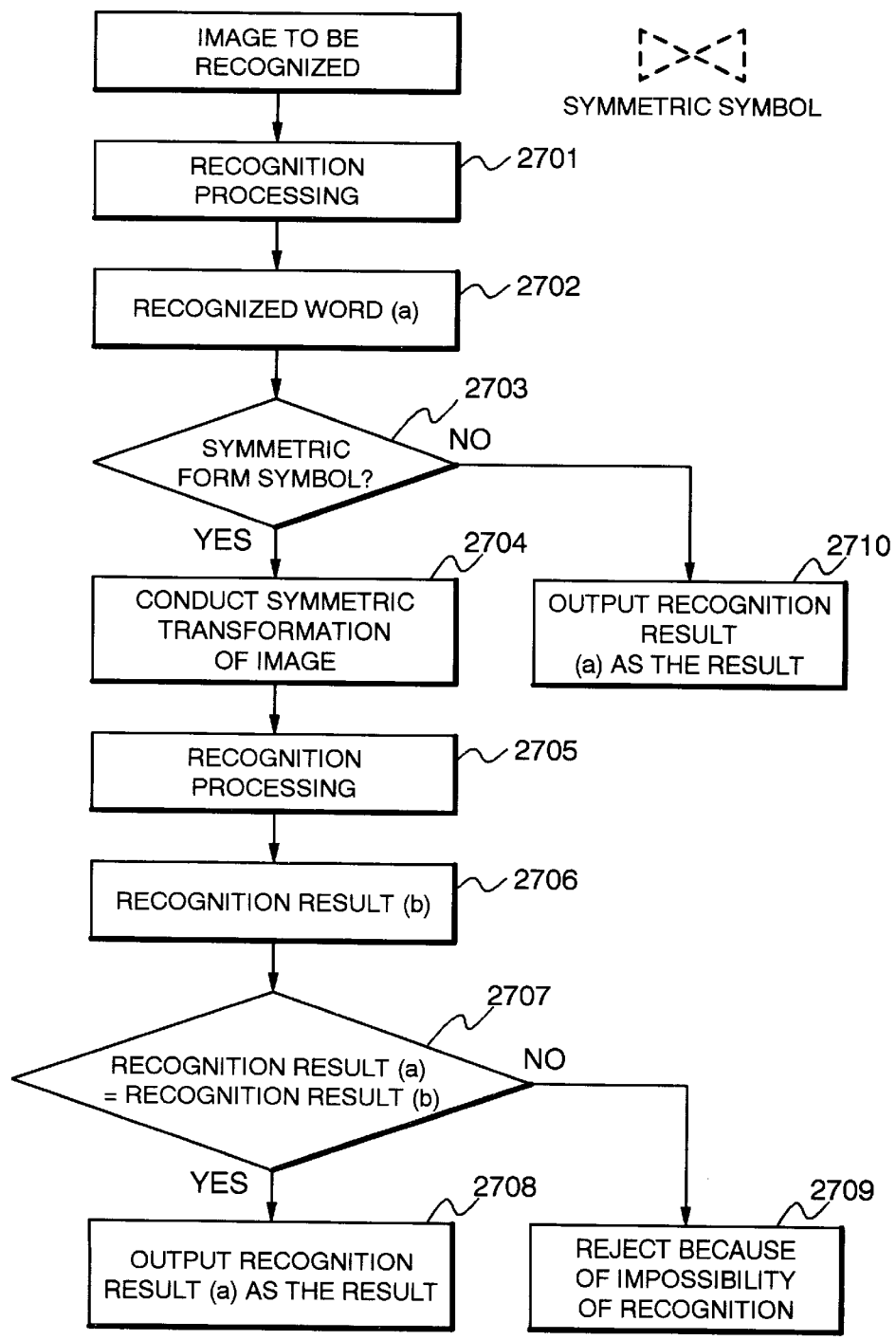
FIG. 27 is a flow chart showing operation of the conventional art shown in FIG. 26.
Figure 28:
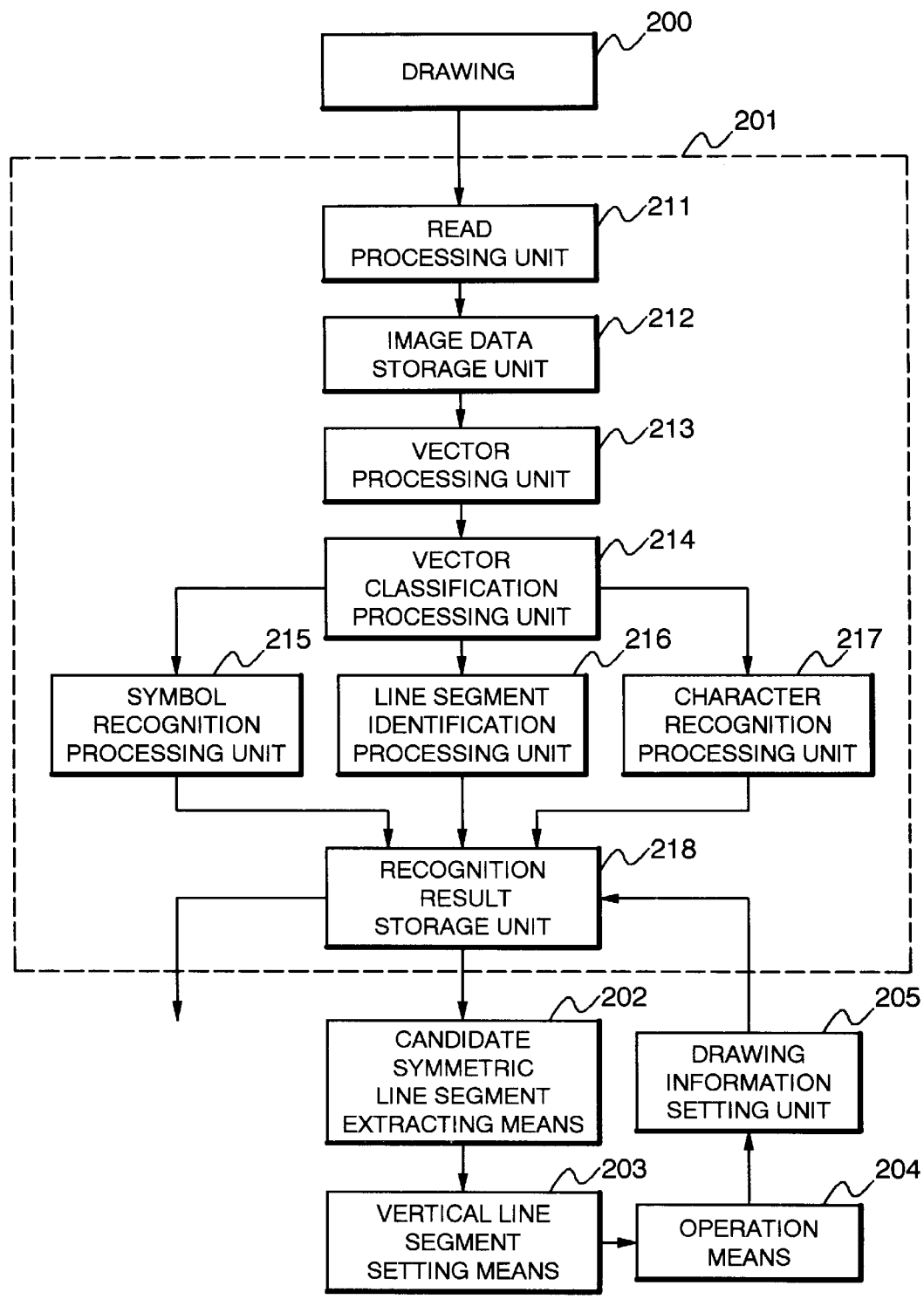
FIG. 28 is a block diagram showing structure of another conventional axisymmetric figure shaping device.
Figure 29:
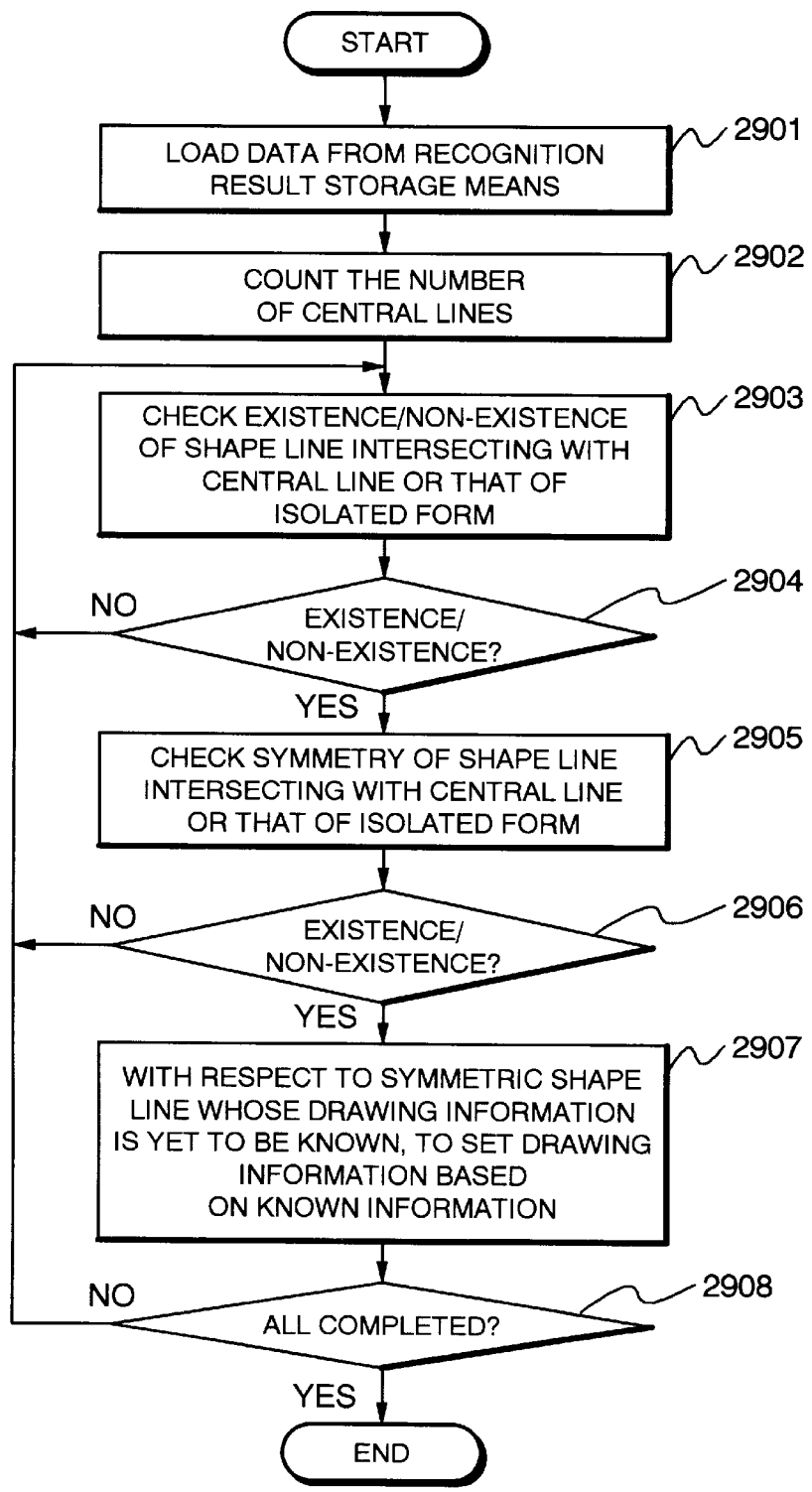
FIG. 29 is a flow chart showing operation of the conventional art shown in FIG. 28.
Figure 30:
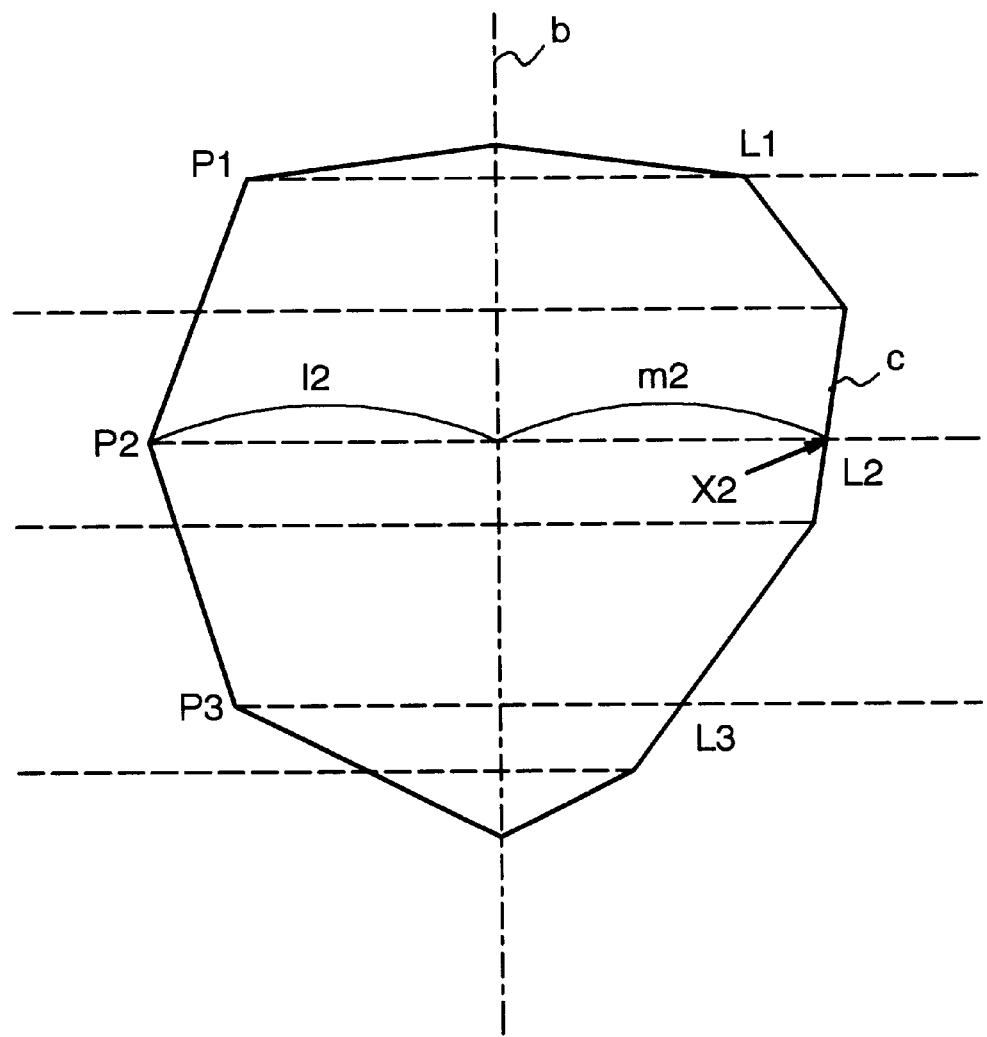
FIG. 30 is a diagram showing a symmetry decision method according to the conventional art shown in FIG. 28.

Operation of the present embodiment will be described with reference to the flow chart shown in FIG. 25.

Since in FIG. 25, operation at Steps 2501 to 2507 is the same as the operation at Steps 1701 to 1707 of the sixth embodiment shown in FIG. 17, no description will be made thereof.

When determination is made as the result of a decision by the symmetry decision units 37A and 37B that an input figure is symmetric with respect to both of candidate vertical and horizontal axes of symmetry, the orthogonal axis symmetrization processing unit 38 corrects, such that pairs of the intersections of a curve and a lattice calculated by the symmetry decision line segment calculating units 34A and 34B and characteristic points are each placed at a position precisely symmetric to the candidate horizontal and vertical axes of symmetry, coordinates of the points of intersection and the characteristic points (Steps 2508 and 2509).

On the other hand, when determination is made that the input figure is symmetric only with respect to either of the candidate vertical and horizontal axes of symmetry, the symmetrization processing unit 39 shapes the input figure so as to be precisely axisymmetric to the candidate axis of symmetry with respect to which the decision is made that the input figure is symmetric. When the determination is made that the input figure is symmetric with respect to the candidate vertical axis of symmetry, for example, the orthogonal axis symmetrization processing unit 39 corrects, such that pairs of the intersections of the curve and the lattice calculated by the symmetry decision line segment calculating unit 34A and the characteristic points are each placed at a position precisely symmetric to the candidate vertical axis of symmetry, coordinates of the points of intersection and the characteristic points (Steps 2510 and 2511).

When the determination is made that an input figure is symmetric with respect to neither of the candidate axes of symmetry, a decision is made that the input figure is not a symmetric figure to complete the processing.

Since with the above-described axisymmetric figure shaping device according to the seventh embodiment, even when an input figure is not symmetric to both of two perpendicular axes of symmetry, if the figure is symmetric at least one of the axes of symmetry, symmetrization processing is conducted based on the one axis of symmetry, it is less likely to determine that the input figure is not a symmetric figure to complete the processing. As a result, it is possible to shape more kinds of input figures.

While the present invention has been described with respect to the preferred embodiments in the foregoing, the present invention is not limited to the above embodiments. In addition, the structures of the above-described first to fifth embodiments can be arbitrarily combined. Furthermore, it is possible to arbitrarily combine the sixth and the seventh embodiments with the validity of decision line segment deciding unit shown in the second embodiment, the axis of symmetry for shaping determining unit shown in the third embodiment, the measure mesh size designating unit shown in the fourth embodiment and the reference element designating unit shown in the fifth embodiment.

As described in the foregoing, the axisymmetric figure shaping device of the present invention enables a horizontal or vertical axis of symmetry to be automatically extracted for a curvilinear figure input by a user to shape the input figure into a figure precisely axisymmetric with respect to one or both of the extracted axes of symmetry. Even when the input figure includes an arbitrary curve, the present invention enables shaping of the input figure in the same manner as that of a linear figure with the need of neither special structure nor special procedure. As a result, irrespective of whether a curve is included, the present invention enables automatic extraction of a linear axis of symmetry from a figure drawn without an axis of symmetry in mind to generate a curvilinear figure precisely axisymmetric with respect to the extracted axis of symmetry.

Secondly, more high-speed processing becomes possible by completing the processing when the symmetry decision line segment where the symmetry condition is not satisfied is extracted.

In addition, higher-speed processing is possible because with a means for deciding whether a symmetry decision line segment itself generated based on a candidate axis of symmetry is symmetric or not prior to the decision of symmetry/asymmetry of an input figure, when a decision is made that a predetermined symmetry decision line segment fails to have symmetry, a candidate axis of symmetry corresponding to the symmetry decision line segment is deleted from candidate axes of symmetry as the objects with respect to which symmetry of an input figure is decided about, whereby the candidate axis of symmetry having no symmetry can be discarded at an early stage.

Third, a means provided for determining an axis of symmetry for use in shaping processing in a case where a plurality of candidate axes of symmetry are appropriate as axes of symmetry for an input figure enables a desired candidate axis of symmetry to be selected as an axis of symmetry for use in shaping processing to shape a figure, whereby shaping results better meeting with user's intention can be obtained. In addition, by appropriately selecting a candidate axis of symmetry to be used as an axis of symmetry, the present invention is allowed to shape an input figure so as to maintain its original form.

Fourth, with a means for changing the size of a measure mesh for calculating a symmetry decision line segment, the present invention is allowed to adjust precision of symmetry decision and a processing speed, thereby improving processing efficiency.

Fifth, with a means for designating an element to be refereed to for determining a position of an axis of symmetry and determining a correction position of coordinates in symmetrization processing, the present invention enables an input figure to be shaped into an axisymmetric figure better meeting with user's intention.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An axisymmetric figure shaping device for shaping an input figure into a figure axisymmetric with respect to a predetermined axis of symmetry, comprising:

input means for receiving input of a figure;

data processing means for shaping an input figure to be precisely symmetric with respect to a predetermined axis of symmetry;

storage means for storing at least an input figure, a figure having been shaped and information regarding characteristic points of these figures; and output means for displaying an input figure and a figure having been shaped;

said data processing means comprising characteristic point calculating means for calculating, from a coordinate point sequence of a figure input through said input means, coordinates of each vertex, maximal and minimal points in the horizontal and the vertical directions of the input figure and taking them as characteristic points of the input figure, candidate axis of symmetry calculating means for calculating a candidate axis of symmetry according to predetermined rules based on characteristic points calculated by said characteristic point calculating means, axis of symmetry for decision determining means for extracting, from all the candidate axes of symmetry calculated by said candidate axis of symmetry calculating means, candidate axes of symmetry for use in the decision of symmetry, one closest to the horizontal and the other closest to the vertical, symmetry decision line segment calculating measure mesh generating means for selecting an arbitrary one of two candidate axes of symmetry calculated by said axis of symmetry for decision determining means to generate a lattice forming a rectangular measure mesh which will cover said input figure centered around the selected candidate axis of symmetry, symmetry decision line segment calculating means for tracing points of intersection of said curve and said lattice forming a measure mesh from one of characteristic points at which said selected candidate axis of symmetry passes toward the other characteristic point, calculating a pair of intersection points located on opposite sides of said candidate axis of symmetry which are to be a reference for deciding about symmetry of said input figure and linking the pair of intersection points by a straight line to generate a symmetry decision line segment for use in deciding about symmetry of said input figure, distance of axis of symmetry calculating means for calculating a distance between a mid-point of said symmetry decision line segment and said candidate axis of symmetry, angle of axis of symmetry calculating means for calculating an angle of the intersection of said symmetry decision line segment and said candidate axis of symmetry to calculate a difference in angle between the angle of the intersection and a predetermined angle, symmetry decision means for calculating dispersion of all the values of a distance between a mid-point of said symmetry decision line segment and a candidate axis of symmetry calculated by said distance of axis of symmetry calculating means and dispersion of all the differences in angle calculated by said angle of axis of symmetry calculating means to decide about symmetry of said input figure according to the calculated dispersion of the parameters, and symmetrization processing means for changing coordinates of a pair of points of intersection of said curve and lattice and coordinates of characteristic points such that said input figure is precisely axisymmetric with respect to said candidate axis of symmetry when a decision is made by said symmetry decision means that said input figure has symmetry.

2. The axisymmetric figure shaping device as set forth in claim 1, wherein said angle of axis of symmetry calculating means calculates a difference in angle between an angle of the intersection of said symmetry decision line segment and said candidate axis of symmetry and 90 degrees as said predetermined angle.

3. The axisymmetric figure shaping device as set forth in claim 1, wherein said data processing means comprises validity of decision line segment determining means for determining whether said symmetry decision line segment itself has symmetry with respect to said candidate axis of symmetry based on parameters calculated by said distance of axis of symmetry calculating means and said angle of axis of symmetry calculating means.

4. The axisymmetric figure shaping device as set forth in claim 1, wherein said data processing means comprises axis of symmetry for shaping determining means for determining, when said symmetry decision means decides that there exist a plurality of candidate axes of symmetry appropriate as an axis of symmetry of said input figure, which candidate axis of symmetry is to be used to conduct symmetric shaping of said input figure.

5. The axisymmetric figure shaping device as set forth in claim 1, wherein said data processing means comprises:

validity of decision line segment determining means for determining whether said symmetry decision line segment itself has symmetry with respect to said candidate axis of symmetry based on parameters calculated by said distance of axis of symmetry calculating means and said angle of axis of symmetry calculating mean, and axis of symmetry for shaping determining means for determining which candidate axis of symmetry is to be used to conduct symmetric shaping of said input figure when said symmetry decision means decides that there exist a plurality of candidate axes of symmetry appropriate as an axis of symmetry of said input figure.

6. The axisymmetric figure shaping device as set forth in claim 1, further comprising:
  measure mesh size designating means for designating the size of a measure mesh formed of a lattice generated by said symmetry decision line segment calculating measure mesh generating means.

7. The axisymmetric figure shaping device as set forth in claim 1, further comprising:
  reference element designating means for designating a reference element for use in symmetric shaping processing of said input figure by said symmetrization processing means.

8. An axisymmetric figure shaping device for shaping an input figure into a figure axisymmetric with respect to a predetermined axis of symmetry, comprising:
  input means for receiving input of a figure;
  data processing means for shaping an input figure to be precisely symmetric with respect to a predetermined axis of symmetry;
  storage means for storing at least an input figure, a figure having been shaped and information regarding characteristic points of these figures; and
  output means for displaying said input figure and a figure having been shaped;
  said data processing means comprising
    characteristic point calculating means for calculating, from a coordinate point sequence of a figure input through said input means, coordinates of each vertex, maximal and minimal points in the horizontal and the vertical directions of the input figure and taking them as characteristic points of the input figure,
    candidate axis of symmetry calculating means for calculating a candidate axis of symmetry according to predetermined rules based on characteristic points calculated by said characteristic point calculating means,
    candidate vertical axis of symmetry determining means for extracting, from all the candidate axes of symmetry calculated by said candidate axis of symmetry calculating means, a candidate vertical axis of symmetry as a candidate axis of symmetry closest to the vertical,
    candidate horizontal axis of symmetry determining means for extracting, from all the candidate axes of symmetry calculated by said candidate axis of symmetry calculating means, a candidate horizontal axis of symmetry based on a candidate vertical axis of symmetry extracted by said candidate vertical axis of symmetry calculating means,
    orthogonal axis of symmetry decision means for deciding whether said candidate vertical axis of symmetry and said candidate horizontal axis of symmetry are approximately perpendicular to each other and when deciding that said two candidate axes of symmetry are approximately perpendicular to each other, shaping said two candidate axes of symmetry to be precisely perpendicular to each other,
    symmetry decision line segment calculating measure mesh generating means for generating a lattice forming a rectangular measure mesh which will cover said input figure, with two perpendicular candidate axes of symmetry shaped by said orthogonal axis of symmetry decision means as the origin,
    symmetry decision line segment calculating means for, with respect to each of said shaped candidate vertical axis of symmetry and candidate horizontal axis of symmetry, tracing points of intersection of said curve and said lattice forming a measure mesh from one of characteristic points at which the candidate axis of symmetry passes toward the other characteristic point, calculating a pair of intersection points located on opposite sides of said candidate axis of symmetry which are to be a reference for deciding about symmetry of said input figure and linking the pair of intersection points by a straight line to generate a symmetry decision line segment for use in deciding about symmetry of said input figure,
    distance of axis of symmetry calculating means for calculating, in a relationship between said candidate vertical axis of symmetry and a symmetry decision line segment generated based on said candidate vertical axis of symmetry and in a relationship between said candidate horizontal axis of symmetry and a symmetry decision line segment generated based on said candidate horizontal axis of symmetry, a distance between a mid-point of each of said symmetry decision line segments and said candidate axis of symmetry corresponding thereto,
    angle of axis of symmetry calculating means for calculating, in a relationship between said candidate vertical axis of symmetry and a symmetry decision line segment generated based on said candidate vertical axis of symmetry and in a relationship between said candidate horizontal axis of symmetry and a symmetry decision line segment generated based on said candidate horizontal axis of symmetry, an angle of the intersection of each of said symmetry decision line segments and said candidate axis of symmetry corresponding thereto to calculate a difference in angle between the angle of the intersection and a predetermined angle,
    symmetry decision means for calculating, for each said candidate axis of symmetry and each said symmetry decision line segment corresponding thereto, dispersion of all the values of a distance between a mid-point of the symmetry decision line segment and the candidate axis of symmetry calculated by said distance of axis of symmetry calculating means and dispersion of all the differences in angle calculated by said angle of axis of symmetry calculating means to decide about symmetry of said input figure according to the calculated dispersion of the parameters, and
    symmetrization processing means for changing coordinates of a pair of points of intersection of said curve and lattice and coordinates of characteristic points such that said input figure is precisely axisymmetric with respect to said candidate vertical axis of symmetry and said candidate horizontal axis of symmetry when a decision is made by said symmetry decision means that said input figure has symmetry with respect to both of said candidate vertical axis of symmetry and said candidate horizontal axis of symmetry.

9. The axisymmetric figure shaping device as set forth in claim 8, wherein
  said angle of axis of symmetry calculating means calculates a difference in angle between an angle of the intersection of said symmetry decision line segment and said candidate axis of symmetry and 90 degrees as said predetermined angle.

10. The axisymmetric figure shaping device as set forth in claim 8, wherein
in the processing for said candidate vertical axis of symmetry and the processing for said candidate horizontal axis of symmetry, said symmetry decision line segment calculating means, said distance of axis of symmetry calculating means, said angle of axis of symmetry calculating means and said symmetry decision means are used in common.

11. The axisymmetric figure shaping device as set forth in claim 8, wherein
said data processing means comprises
validity of decision line segment determining means for determining whether said symmetry decision line segment itself has symmetry with respect to said candidate axis of symmetry based on parameters calculated by said distance of axis of symmetry calculating means and said angle of axis of symmetry calculating means.

12. The axisymmetric figure shaping device as set forth in claim 8, wherein
said data processing means comprises
axis of symmetry for shaping determining means for determining, when said symmetry decision means decides that there exist a plurality of candidate axes of symmetry appropriate as an axis of symmetry of said input figure, which candidate axis of symmetry is to be used to conduct symmetric shaping of said input figure.

13. The axisymmetric figure shaping device as set forth in claim 8, further comprising:
measure mesh size designating means for designating the size of a measure mesh formed of a lattice generated by said symmetry decision line segment calculating measure mesh generating means.

14. The axisymmetric figure shaping device as set forth in claim 8, further comprising:
reference element designating means for designating a reference element for use in symmetric shaping processing of said input figure by said symmetrization processing means.

15. The axisymmetry figure shaping device as set forth in claim 8, further comprising:
second symmetrization processing means for shaping said input figure, when a decision is made by said symmetry decision means that said input figure has symmetry with respect to only either said candidate vertical axis of symmetry or said candidate horizontal axis of symmetry, so as to be precisely axisymmetric with respect to the candidate axis of symmetry to which the decision is made that said input figure has symmetry.

16. The axisymmetric figure shaping device as set forth in claim 15, further comprising:
reference element designating means for designating a reference element for use in symmetric shaping processing of said input figure by said second symmetrization processing means.

17. An axisymmetric figure shaping device for shaping an input figure into a figure axisymmetric with respect to a predetermined axis of symmetry, comprising:
input means for receiving input of a figure formed including a curve;
data processing means for shaping an input figure to be precisely symmetric with respect to a predetermined axis of symmetry;
storage means for storing at least an input figure, a figure having been shaped and information regarding characteristic points of these figures; and
output means for displaying an input figure and a figure having been shaped;
said data processing means comprising
characteristic point calculating means for calculating, from a coordinate point sequence of a figure input through said input means, coordinates of each vertex, maximal and minimal points in the horizontal and the vertical directions of the input figure and taking them as characteristic points of the input figure,
candidate axis of symmetry calculating means for calculating a candidate axis of symmetry for use in the decision of symmetry based on characteristic points calculated by said characteristic point calculating means,
symmetry decision means for deciding about symmetry of said input figure with respect to said candidate axis of symmetry calculated by said candidate axis of symmetry calculating means, and
shaping means for shaping said input figure, when a decision is made by said symmetry decision means that said input figure has symmetry with respect to said candidate axis of symmetry, so as to be precisely axisymmetric with respect to said candidate axis of symmetry.

18. The axisymmetric figure shaping device as set forth in claim 17, wherein
said candidate axis of symmetry calculating means calculates a pair of perpendicular candidate axes of symmetry for use in the decision of symmetry based on characteristic points calculated by said characteristic point calculating means,
said symmetry decision means decides about symmetry of said input figure with respect to each of said two candidate axes of symmetry calculated by said means for calculating a pair of candidate axes of symmetry, and
said shaping means shapes said input figure, when a decision is made by said means for deciding about symmetry that said input figure has symmetry with respect to both of said two candidate axes of symmetry, so as to be precisely axisymmetric with respect to both of said two candidate axes of symmetry.

19. An axisymmetric figure shaping method of shaping an input figure into a figure axisymmetric with respect to a predetermined axis of symmetry, comprising the steps of:
calculating, from a coordinate point sequence of a figure input through said input means, coordinates of each vertex, maximal and minimal points in the horizontal and the vertical directions of the input figure and taking them as characteristic points of the input figure;
calculating a candidate axis of symmetry according to predetermined rules based on calculated characteristic points;
extracting, from all the calculated candidate axes of symmetry, candidate axes of symmetry for use in the decision of symmetry, one closest to the horizontal and the other closest to the vertical;
selecting an arbitrary one of calculated two candidate axes of symmetry to generate a lattice forming a rectangular measure mesh which will cover said input figure centered around the selected candidate axis of symmetry;
tracing points of intersection of said curve and said lattice forming a measure mesh from one of characteristic points at which a selected candidate axis of symmetry passes toward the other characteristic point, calculating a pair of intersection points located on opposite sides of said candidate axis of symmetry which are to be a reference for deciding about symmetry of said input figure and linking the pair of intersection points by a straight line to generate a symmetry decision line segment for use in deciding about symmetry of said input figure;

calculating a distance between a mid-point of said symmetry decision line segment and said candidate axis of symmetry;

calculating an angle of the intersection of said symmetry decision line segment and said candidate axis of symmetry to calculate a difference in angle between the angle of the intersection and 90 degrees;

calculating dispersion of all the calculated values of a distance between a mid-point of said symmetry decision line segment and a candidate axis of symmetry and dispersion of all the calculated differences in angle to decide about symmetry of said input figure according to the calculated dispersion of the parameters; and changing coordinates of a pair of points of intersection of said curve and lattice and coordinates of characteristic points such that said input figure is precisely axisymmetric with respect to said candidate axis of symmetry when a decision is made that said input figure has symmetry.

20. The axisymmetric figure shaping method as set forth in claim 19, wherein a decision whether said symmetry decision line segment itself has symmetry with respect to said candidate axis of symmetry is made based on parameters calculated at said distance of axis of symmetry calculating step and said angle of axis of symmetry calculating step.

21. The axisymmetric figure shaping method as set forth in claim 19, wherein when the decision is made that there exist a plurality of candidate axes of symmetry appropriate as an axis of symmetry of said input figure at said symmetry deciding step, determination is made which candidate axis of symmetry is to be used to conduct symmetric shaping of said input figure.

22. An axisymmetric figure shaping method of shaping an input figure into a figure axisymmetric with respect to a predetermined axis of symmetry, comprising the steps of:

calculating, from a coordinate point sequence of an input figure, coordinates of each vertex, and maximal and minimal points in the horizontal and the vertical directions of the input figure and taking them as characteristic points of the input figure;

calculating a candidate axis of symmetry according to predetermined rules based on calculated characteristic points;

extracting, from all the calculated candidate axes of symmetry, a candidate vertical axis of symmetry as a candidate axis of symmetry closest to the vertical;

extracting, from all the calculated candidate axes of symmetry, a candidate horizontal axis of symmetry based on an extracted candidate vertical axis of symmetry;

deciding whether said candidate vertical axis of symmetry and said candidate horizontal axis of symmetry are approximately perpendicular to each other and when a decision is made that said two candidate axes of symmetry are approximately perpendicular to each other, shaping said two candidate axes of symmetry to be precisely perpendicular;

generating a lattice forming a rectangular measure mesh which will cover said input figure, with a point of intersection of shaped two perpendicular candidate axes of symmetry as the origin;

with respect to each of said shaped candidate vertical axis of symmetry and candidate horizontal axis of symmetry, tracing points of intersection of said curve and said lattice forming a measure mesh from one of characteristic points at which the candidate axis of symmetry passes toward the other characteristic point, calculating a pair of intersection points located on opposite sides of said candidate axis of symmetry which are to be a reference for deciding about symmetry of said input figure and linking the pair of intersection points by a straight line to generate a symmetry decision line segment for use in deciding about symmetry of said input figure;

in a relationship between said candidate vertical axis of symmetry and a symmetry decision line segment generated based on said candidate vertical axis of symmetry and in a relationship between said candidate horizontal axis of symmetry and a symmetry decision line segment generated based on said candidate horizontal axis of symmetry, calculating a distance between a mid-point of each of said symmetry decision line segments and said candidate axis of symmetry corresponding thereto;

in a relationship between said candidate vertical axis of symmetry and a symmetry decision line segment generated based on said candidate vertical axis of symmetry and in a relationship between said candidate horizontal axis of symmetry and a symmetry decision line segment generated based on said candidate horizontal axis of symmetry, calculating an angle of the intersection of each said symmetry decision line segment and said candidate axis of symmetry corresponding thereto to calculate a difference in angle between the angle of the intersection and 90 degrees;

for each said candidate axis of symmetry and each said symmetry decision line segment corresponding thereto, calculating dispersion of all the calculated values of a distance between a mid-point of the symmetry decision line segment and the candidate axis of symmetry and dispersion of all the calculated differences in angle to decide about symmetry of said input figure according to the calculated dispersion of the parameters; and changing coordinates of a pair of points of intersection of said curve and lattice and coordinates of characteristic points such that said input figure is precisely axisymmetric with respect to said candidate vertical axis of symmetry and said candidate horizontal axis of symmetry when a decision is made that said input figure has symmetry with respect to both of said candidate vertical axis of symmetry and said candidate horizontal axis of symmetry.

23. The axisymmetric figure shaping method as set forth in claim 22, wherein said angle of axis of symmetry calculating means calculates a difference in angle between an angle of the intersection of said symmetry decision line segment and said candidate axis of symmetry and 90 degrees as said predetermined angle.

24. The axisymmetric figure shaping method as set forth in claim 22, wherein a decision is made whether said symmetry decision line segment itself has symmetry with respect to said candidate axis of symmetry based on parameters calculated at said distance of axis of symmetry calculating step and said angle of axis of symmetry calculating step.

25. The axisymmetric figure shaping method as set forth in claim 22, wherein when the decision is made that there exist a plurality of candidate axes of symmetry appropriate as an axis of symmetry of said input figure, determination is made which candidate axis of symmetry is to be used to conduct symmetric shaping of said input figure.

26. The axisymmetry figure shaping method as set forth in claim 22, wherein when a decision is made at said symmetry decision step that said input figure has symmetry with respect to only either said candidate vertical axis of symmetry or said candidate horizontal axis of symmetry, said input figure is shaped so as to be precisely axisymmetric with respect to the candidate axis of symmetry to which the decision is made that said input figure has symmetry.

27. An axisymmetric figure shaping method of shaping an input figure into a figure axisymmetric with respect to a predetermined axis of symmetry, comprising the steps of:

calculating, from a coordinate point sequence of a figure formed including a curve and input through said input means, coordinates of each vertex, maximal and minimal points in the horizontal and the vertical directions of the input figure and taking them as characteristic points of the input figure;

calculating a candidate axis of symmetry for use in the decision of symmetry based on calculated characteristic points;

deciding about symmetry of said input figure with respect to said calculated candidate axis of symmetry; and when a determination is made in the decision that said input figure has symmetry with respect to said candidate axis of symmetry, shaping said input figure so as to be precisely axisymmetric with respect to said candidate axis of symmetry.

28. The axisymmetric figure shaping method as set forth in claim 27, wherein at said candidate axis of symmetry calculating step, a pair of perpendicular candidate axes of symmetry for use in the decision of symmetry is calculated based on calculated characteristic points, at said symmetry decision step, decision is made about symmetry of said input figure with respect to each of said two candidate axes of symmetry calculated by said means for calculating a pair of candidate axes of symmetry, and at said shaping step, when a determination is made by the decision by said means for deciding about symmetry that said input figure has symmetry with respect to both of said two candidate axes of symmetry, said input figure is shaped so as to be precisely axisymmetric with respect to both of said two candidate axes of symmetry.

* * * * *